US006683765B2

(12) United States Patent
Kanamori

(10) Patent No.: US 6,683,765 B2
(45) Date of Patent: Jan. 27, 2004

(54) SWITCHING POWER UNIT

(75) Inventor: Atsushi Kanamori, Kashihara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/201,276

(22) Filed: Jul. 24, 2002

(65) Prior Publication Data

US 2003/0020437 A1 Jan. 30, 2003

(30) Foreign Application Priority Data

Jul. 26, 2001 (JP) ....................................... 2001-226755

(51) Int. Cl.[7] ................................................. H02H 7/00
(52) U.S. Cl. ........................................... 361/18; 361/94
(58) Field of Search ........................ 361/18, 93.1, 93.9, 361/94

(56) References Cited

U.S. PATENT DOCUMENTS 4,979,068 A * 12/1990 Sobhani et al. ............... 361/18
6,141,193 A * 10/2000 Mercer ........................ 361/18

FOREIGN PATENT DOCUMENTS

JP 07-046828 2/1995
JP 2000-245142 9/2000

* cited by examiner

*Primary Examiner*—Shawn Riley
(74) *Attorney, Agent, or Firm*—Birch, Stewart, Kolasch & Birch, LLP

(57) ABSTRACT

In a switching power unit for performing an overcurrent protecting operation by shortening a switching pulse, an oscillation frequency changing circuit drops an oscillation frequency of an oscillator when an overcurrent is detected by an overcurrent detection circuit, and an RS flip-flop circuit performs the overcurrent protecting operation. When an output voltage is dropped due to a short circuit etc., the oscillation frequency changing circuit further drops the oscillation frequency of the oscillator. In an arrangement in which a frequency under a normal loading condition is made higher by considering the response delay in the overcurrent protecting operation in this manner, an overcurrent detection output is given to the oscillation frequency dropping circuit via the RS flip-flop circuit, so that it is necessary to provide a time constant circuit which prevents hunting and it is possible to miniaturize chip size of an integrated circuit itself. As a result, in the switching power unit for performing the overcurrent protecting operation, it is possible to miniaturize externally provided parts by making a switching frequency higher and to miniaturize the integrated circuit itself.

7 Claims, 17 Drawing Sheets

SWITCHING POWER UNIT

FIELD OF THE INVENTION

The present invention relates to a switching power unit that has an overcurrent protecting function for restricting an output current in a case where electrical overload or output short circuit occurs.

BACKGROUND OF THE INVENTION

An example of the switching power unit having the overcurrent protecting function is shown in FIG. 11. As to the switching power unit, an input voltage vin smoothed in a capacitor c1 of an input stage is switched by a transistor tr1. During a period in which the transistor tr1 is ON, energy is provided to a coil 11, a capacitor c2, and a load r1 by a voltage vout that appears in an emitter of the transistor tr1. During a period in which the transistor tr1 is OFF, energy accumulated in the coil 11 is refluxed by a diode dl so as to be given to the load r1.

An output voltage vo is controlled in accordance with (a) a feedback voltage vadj obtained by dividing the output voltage vo at a predetermined ratio based on resistance values of resistors r1 and r2, and (b) a reference voltage vref1 of a reference voltage source 2. First, a voltage corresponding to a difference between both the voltages is outputted by a differential amplifier 1, and a comparator 4 compares the voltage with a triangular wave of 100 [kHz] outputted from an oscillator 3. Then, the comparator 4 outputs a PWM signal having a pulse width corresponding to an output level of the differential amplifier 1.

Next, when the PWM signal is given to a drive circuit 5, the drive circuit 5 controls the transistor tr1 so as to be ON/OFF corresponding to a duty cycle of the PWM signal. Thus, the output voltage vo is controlled by a constant voltage (for example, 5 [V]) determined by (a) the reference voltage vref1 and (b) a dividing ratio based on the resistors r1 and r2.

Upon the foregoing operation, as shown by vcmp and vout in FIG. 12, the output voltage of the comparator 4, that is, the PWM signal and the voltage vout have pulse widths indicated in the figure. When ON time and OFF time of the transistor tr1 are indicated by tON and tOFF respectively, a duty D of the transistor tr1 is as follows.

$$
\begin{aligned}
D &= tON/(tON+tOFF)\times 100\ [\%] \qquad (1)\\
&= (vO/vIN)\times 100\ [\%]
\end{aligned}
$$

However, when the load r1 is under a heavy-loading condition, a coil current i1 that flows into the coil 11 increases as shown by a difference between the broken line and the continuous line in the figure. When the coil current i1 exceeds an overcurrent detection level ic1, an overcurrent condition is detected by an overcurrent detection circuit 6 provided on the input stage, and a set signal is outputted to an RS flip-flop circuit 7.

The RS flip-flop circuit 7 is set when a set terminal voltage vset is varied to a high level. Once the set terminal voltage vset becomes a high level, the RS flip-flop circuit 7 is latched, so that the output is retained at a low level. At this time, a reset terminal voltage vrst remains at a low level.

Although the output voltage vcmp and the voltage vout of the comparator 4 have pulse widths shown by the broken line in FIG. 12, the pulse widths are shortened as shown by the continuous line because the output of the RS flip-flop circuit 7 remains at a low level since the RS flip-flop circuit 7 has been set. The duty of the transistor tr1 drops in this manner, so that the output voltage vo drops. Thus, the increase in the output current is restricted. Consequently, the output current io drops at A point as shown in FIG. 13.

Further, a reset signal is outputted from the oscillator 3 to the RS flip-flop circuit 7 when the transistor tr1 is OFF, and the reset terminal voltage of the RS flip-flop circuit 7 as shown by vrst in FIG. 12. At this time, once the reset terminal voltage becomes a high level, the RS flip-flop circuit 7 is latched, and the RS flip-flop circuit retains the output at a high level unlike the case where the set terminal voltage becomes high. Thus, under the next ON condition, the transistor tr1 becomes ON at an ordinary timing.

However, in the switching power unit, when switching frequency is made higher (not less than approximately 50 [kHz]) so as to miniaturize the switching power unit and realize light weight etc., disadvantages occur in the operation of the overcurrent protecting function as described below.

That is, as shown in FIG. 12, there occur delays both in td1, a time the set terminal voltage takes to be a high level, and in td2, a time the transistor tr1 takes to turn OFF after the set terminal voltage become a high level. A delay time td, a total of both the td1 and td2, is a time the transistor tr1 takes to turn OFF after the overcurrent detection has been performed, that is, a time the overcurrent protecting function takes to begin operating. The delay time td comes to approximately 1 [$\mu$sec]. When the switching pulse width is shortened upon overcurrent protecting operation at the switching frequency of 100 [kHz], that is, at a switching cycle of 10 [$\mu$sec], this influences the protecting operation so greatly that this has to be taken into consideration.

For example, supposing that input voltage vin=40[V], and output voltage vo=5[V], and inductance L of coil 11=200 [$\mu$H], a current $\Delta$i that is variation of the coil current i1 at the delay time td is as follows.

$$\Delta i=[(vin-vo)/L]\times td=0.175[A] \qquad (2)$$

Thus, the coil current i1 exceeds the overcurrent detection level ic1 due to the current $\Delta$i. Then, the current variation $\Delta$i increases an average current, that is, the output current io.

An output characteristic at this time, as shown in FIG. 13, is such that an emitter current increases as the load approaches a short circuit condition (vo=0[V]), and the emitter current exceeds an absolute maximum rating value (2.5[A]), so that a drooping characteristic is not realized. The foregoing switching power unit has such a problem that: the overcurrent protecting function does not operate exactly as the switching frequency becomes higher.

Japanese Unexamined Patent Publication No. 46828/1995 (Tokukaihei 7-46828)(Publication date: Feb. 14, 1995) discloses another prior art for solving the foregoing problem. FIG. 14 and FIG. 15 show the prior art. These FIGS. 14 and 15 correspond to the foregoing FIGS. 11 and 13 respectively, and the same reference numerals are given to corresponding portions. It is remarkable that the switching power unit is further provided with a comparator 8, a constant voltage source 9, and an oscillation frequency changing circuit 10 so as to reduce the oscillation frequency in the case where the overcurrent occurs due to the output short circuit.

The voltage vadj obtained by the resistors r1 and r2 is given to a non-inverting input of the comparator 8, and the constant voltage source 9 is connected to an inverting input of the comparator 8. The reference voltage vref1 generated by the reference voltage source 2 is, for example, 1.25[V]. On the other hand, a reference voltage vref2 generated by the reference voltage source 9 is, for example, 0.6[V]. When the feedback voltage vadj to the comparator 8 is 0.6[V], the output voltage vo is as follows.

$$Vo=0.6[V]\times(r1+r2)/r2=2.4[V] \quad (3)$$

That is, the comparator 8 detects that the output voltage vo becomes lower than 2.4[V] shown in the foregoing expression. Responding to this, the oscillation frequency changing circuit 10 drops the oscillation frequency of the triangle wave, brought about by the oscillator 3, from 100[kHz] to 20[kHz].

Thus, a resistance value of the load r1 is made smaller by load short circuit etc., so that the output current io increases. When a collector current of the transistor tr1 increases so as to exceed the overcurrent detection level, the overcurrent detection circuit 6 detects the overcurrent condition, so that the overcurrent protecting function begins operating. Then, the RS flip-flop circuit 7 is set by a set signal outputted from the current detection circuit 6. The switching pulse width of the transistor tr1 is shortened, and a time in which the transistor tr1 remains ON is shortened, so that the output voltage vo drops at A point in FIG. 15 as described above.

Further, when the resistance value of the load r1 becomes low, the output voltage vo drops to B point shown in the figure so as to be 2.4[V], and the feedback voltage vadj at this time becomes 0.6[V]. When the output voltage vo further drops and the feedback voltage vadj becomes lower than 0.6[V] of the reference voltage vref2, the output of the comparator 8 that has been a high level becomes a low level, and the oscillation frequency changing circuit 10 outputs a voltage for instructing the oscillator 3 to change the oscillation frequency, so that the oscillator 3 drops the oscillation frequency from 100[kHz] to 20[kHz].

Even though there occurs the following state, that is, even though the switching pulse width is shortened by an ordinary overcurrent protecting operation and the switching pulse width that is determined by the delay time from the overcurrent detection to turning OFF of the transistor tr1 approaches the minimum, the output of the comparator 8 varies at B point and the switching frequency drops, so that the switching pulse width is widened.

For example, the transistor tr1 usually performs switching at a duty D of 5[V]/12[V]≈41.7[%] based on the foregoing expression 1, and when the output voltage vo is 2.4[V] at B point, the duty D is 20[%] based on the expression 1, so that the switching pulse width increases from 2 [μsec] to 10 [μsec]. Therefore, it is possible to reduce the influence exerted by the delay time td in the overcurrent protecting operation by ⅕ in comparison with the prior art.

Thus, as shown in FIG. 15, the output current io returns to a regular overcurrent point from B point, at which the switching frequency fs begins to drop, to C point, at which the switching frequency stops dropping, so that the output current io drops. After passing through C point, the oscillation frequency is fixed at 20 [kHz]. When the load r1 is under a light-loading condition, the switching pulse width is shortened, so that the delay time td have a greater influence. As a result, the output current io increases.

However, as described above, since the output current io is dropped from B point to C point, it is possible to greatly restrict the increase of the output current io. Thus, the output current io does not exceed the absolute maximum rating 2.5[A]. Note that, in FIG. 15, the broken line indicates the overcurrent protecting characteristic shown in FIG. 13.

While, it is still required to realize miniaturization and a low cost of the switching power supply. In order to realize the miniaturization and the low cost, it is effective that the switching power unit including the transistor tr1 is made as an integrated circuit and the coil 11 and a capacitor c2 externally provided on the integrated circuit are miniaturized. Then, a step of making the switching frequency fs higher can be employed. While, also a bipolar element of a comparatively reasonable price can cover 300 [kHz], the switching frequency fs as the integrated circuit.

However, also in the prior art shown in FIG. 14, when the respective voltages are such that vin=24[V], vo=5[V], the duty D under an ordinary operation condition is approximately 20.8[%] based on the expression 1, and fs=300 [kHz] (switching cycle T=3.33 [μsec], and ON time tON is as follows.

$$tON=T\times D=3.33\times0.208=693[nsec] \quad (4)$$

As a result, the ON time tON becomes shorter than 1 [μsec], the delay time td.

Thus, as shown by a virtual line (chain line) in FIG. 15, even though the overcurrent is detected at A point and the protecting operation is performed, the protecting operation is performed after the ON time tON has passed in the transistor tr1, so that the overcurrent protecting operation is nullified. As a result, the output current io increases. Further, when the load r1 is under a heavy loading condition and the output current io increases so as to exceed the capacity of the transistor tr1, for example, 3.0[A], a voltage drop $^{V}$CE between the collector and the emitter of the transistor tr1 begins increasing, and a damage of the transistor tr1 increases, so that the efficiency drops. As a result, the output voltage vo begins to drop. When the voltage at D point is vo=2.4[V], the switching frequency fs drops due to the operation of the oscillation frequency changing circuit 10, so that an ordinary overcurrent protecting operation is performed. As a result, the voltage comes to C point.

That is, although the overcurrent protecting operation is performed after passing through C point, that is, after the short circuit protecting operation is performed between D to C points, the overcurrent protecting operation is not performed between A to D points. Further, the increase in the voltage drop $^{V}$CE gives more damage to the transistor tr1, so that it is required to widen an area for safety operation (ASO) of the transistor tr1. As a result, there occurs such a problem that the size and cost of the transistor tr1 are increased.

Then, in order to solve the foregoing problem, still another prior art is proposed in Japanese Unexamined Patent Publication No. 245142/2000 (Tokukai 2000-24514 2)(Publication date: Sep. 8, 2000). The prior art is shown in FIG. 16. In a structure of FIG. 16, the same reference numerals are given to portions that are similar to and correspond to portions shown in FIG. 11 and FIG. 14, and descriptions thereof are omitted. It is remarkable that, in the prior art, a second oscillation frequency changing circuit **10*b* corresponds to the oscillation frequency changing circuit 10 in the structure of FIG. 11 and FIG. 14, and there is provided a first oscillation frequency changing circuit 10*a* which drops the oscillation frequency of the oscillator 3 in response to the overcurrent detection circuit 11**.

The oscillator 3 drops the oscillation frequency from a first oscillation frequency such as 300 [kHz] to a second oscillation frequency such as 100 [kHz] in response to an output of the first oscillation frequency changing circuit **10*a*. The oscillator 3 drops the oscillation frequency from 100 [kHz] that is the second oscillation frequency to 20 [kHz] that is a third oscillation frequency in response to an output of the second oscillation frequency changing circuit 10*b***.

Thus, as shown in FIG. 17, the oscillator 3 operates at fs=300 [kHz] under an ordinary loading condition, and when the load r1 is under a heavy loading condition, and the resistance value of the load r1 becomes small, and the output current io increases, and the collector current of the transistor tr1 increases, and the collector current exceeds the overcurrent detection level of 2[A] at A point of FIG. 17, the overcurrent detection circuit 6 detects the overcurrent condition so as to start the overcurrent protecting operation, and the first oscillation frequency changing circuit 10*a* switches to the operation at fs=100 [kHz]. Further, the RS flip-flop circuit 7 is set, and the switching pulse width of the transistor tr1 is shortened, and the ON time of the transistor tr1 becomes short, so that the output voltage vo drops at A point.

Further, when the resistance value of the load r1 becomes small, the output voltage vo drops to B point so as to be 2.4[V], so that the feedback voltage vadj becomes 0.6[V]. When the output voltage vo further drops and the feedback voltage vadj becomes smaller than 0.6[V] of the reference voltage vref2, the second oscillation frequency changing circuit 10*b* switches to the operation at fs=20 [kHz]. Even though there occurs the following state, that is, even though the switching pulse width is shortened by an ordinary overcurrent protecting operation and the switching pulse width that is determined by the delay time td approaches the minimum, the switching frequency drops again at B point, so that the switching pulse width is widened. Thus, the output current io drops from B point, at which the switching frequency fs begins to drop, to C point, at which the drop comes to an end, so as to return to the regular overcurrent point 2[A].

Since the oscillation frequency is fixed at 20 [kHz] after passing through C point, the switching pulse width is shortened when the load r1 becomes smaller, and the delay time td has such a great influence that the output current io increases. However, since the output current io is made to drop in advance from B point to C point, it is possible to restrict the increase in the output current io greatly. Thus, the output current io does not exceed the absolute maximum rating, 2.5[A] for example. Note that, in FIG. 17, the broken line shows the overcurrent protecting characteristic in a case where the switching frequency fs is fixed so that fs=100 [kHz].

In this manner, the switching frequency is made to drop not only at a time when the output voltage vo drops due to the output short circuit etc. but also at a time of the overcurrent detection, so that the switching frequency fs under a normal loading condition is heightened to 300 [kHz], the upper limit in the operation frequency of the transistor tr1. Further, the external coil 11 and the capacitor c2 are miniaturized. Thus, miniaturization and a low cost of the switching power unit are realized.

In the switching power unit arranged in the foregoing manner, a time constant circuit with a capacitor is used in switching the switching frequency so as to prevent hunting. This is illustrated in FIG. 18. FIG. 18 is an electric circuit diagram showing a concrete structure of the first oscillation frequency changing circuit 10*a* and the second oscillation frequency changing circuit 10*b*. Note that, FIG. 18 shows a resistor r11 and a transistor q11, that partially constitute the overcurrent detection circuit 6, and a constant current circuit 3*a* in the oscillator 3. An output current i40 from the constant current circuit 3*a* is given to the oscillator circuit, and the oscillator circuit oscillates at a frequency corresponding to the current i40.

First, the first oscillation frequency changing circuit 10*a* is provided with a constant current source f21, a capacitor c21, transistors q21 to q24, resistors r21 and r22. A series circuit of the constant current source f21 and the capacitor c21 intervene between a power line 12 to which the power voltage vs is given and a ground line 13. Also, there are provided (a) a series circuit of the resistor r21 and the transistor q21 and (b) a series circuit of the transistor q23 generating a constant current i21, the resistor r22, and the transistor q22, between the power lines 12 and 13 so that the series circuits are connected to each other. The transistor q11 is provided in parallel to the capacitor c21, and an output voltage of the capacitor c21 is given to a base of the transistor q21. A connecting point between the resistor r21 and the transistor q21 is connected to a base of the transistor q22. The diode-connected transistor q23 constitutes a current mirror circuit in combination with the transistor q24.

Thus, the transistor q11 is OFF under a rated-load condition, and the capacitor c21 is charged by the constant current source f21, and the charging voltage causes the transistor q21 to be ON, and the transistor q22 becomes OFF so that the current i21 becomes 0, and the output current i22 from the transistor q24 also becomes 0. On the other hand, when the overcurrent condition causes the transistor q11 to be ON, charges charged in the capacitor c21 are discharged, and the transistor q21 becomes OFF, and the transistor q22 becomes ON so that the current i21 flows, and the output current i22 flows from the first oscillation frequency changing circuit 10*a* to a constant current generating circuit 3*a*. of the oscillator 3

Here, an emitter area ratio of the transistors q23 and q24 is 1:1, and 2.6[V] is selected for the power voltage vs, and 46 [kΦ] is selected for the resistance value of the resistor r22. Thus, the relationship of them is as follows.

$$i22=i21=(vs-V_{BE}-V_{SAT})/r22 \qquad (5)$$

Here, $V_{BE}$ is a voltage between the base and the emitter of the transistor q23, for example, the voltage is 0.65[V]. Further, $V_{SAT}$ is a saturation voltage in a case where the transistor q22 is ON, for example, the voltage is 0.1[V]. Thus, based on the expression (5), it is possible to cause a current of i22=40 [μA] to flow.

The second oscillation frequency changing circuit 10*b* is provided with transistors q31 to q34, resistors r31 and r32, and a constant current source f31. The constant current source f31 provides a constant current i31 to emitters of the transistors q31 and q32 constituting a pair of differentials. The feedback voltage vadj is given to a base of the transistor q31, and a collector is grounded. A reference voltage vref3 generated by the resistors r31 and r32, dividing voltages, which intervene between the power lines 12 and 13, for example, a voltage of 0.6[V] is given to a base of the transistor q31. A collector of the transistor q32 is grounded via the diode-connected transistor q33. The transistor q33 constitutes a current mirror circuit in combination with the transistor q34.

An emitter ratio of the transistors q33 and q34 is set to 1:3, and the current is set to i31=20 [μA]. Thus, when vo=5[V] under a normal loading condition, vadj=1.25[V] and vref3<vadj, and the transistor q31 becomes OFF, and the transistors q32 and q33 become ON, and the transistor q34 can draw a current of 60 [μA].

The constant current generating circuit 3*a* is provided with transistors q41 to q48, diodes d41 to d44, and a constant current source f41. A series circuit of the constant current source f41 and the diode-connected transistor q41 intervenes between the power lines 12 and 13, and the series circuit generates a constant current i41. The transistor q41 constitutes a current mirror circuit in combination with the transistors q42, q43, and q44, and an emitter ratio of the respective transistors q41, q42, q43, and q44 is 1:1:2:1.

The transistor q42 constitutes a series circuit for generating the output current i40 in combination with a diode-connected transistor q45, diodes d41 and d42 so that the series circuit intervenes between the power lines 12 and 13. A series circuit of the diode d42 and the transistor q42 is provided in parallel to the series circuit of the diode d43 and the transistor q43. An output current i22 from the first oscillation frequency changing circuit 10*a* flows into a collector of the transistor q43.

Further, the transistor q44 is connected to a diode-connected transistor q46 in series, and intervenes between the power lines 12 and 13. While, a series circuit of the transistor q45 and the diode d41 is provided in parallel to the series circuit of the transistor q47 and the diode d44. The transistor q46 and a transistor q47 constitute a current mirror circuit. Thus, a current whose amount is in proportion to an amount of the i44 flowing in the transistor d44 is supplied by the transistors q46 and q47 so as to flow into a cathode side of the diode d41. A collector of the transistor q47 is connected to a collector of the transistor q34.

An emitter area ratio of the transistor q46 and the transistor q47 is set to 1:0.8. The current i41 provided from the constant current source f41 to the transistor q41 is set to 10 [μA]. Thus, currents i42 and i44 flowing in the transistors q42 and q44 are respectively 10 [μA], and a current i43 flowing in the transistor q43 is 20 [μA], and a current i145 flowing in the transistor q47 is 8 [μA]. A current corresponding to a current i46 flowing in the transistor q45 is made to flow by the transistor q48 which constitutes a current mirror circuit in combination with the transistor q45 at an emitter ratio of 1:1, and is outputted as the output current i40.

In the constant current generating circuit 3*a* arranged in this manner, the transistor q24 becomes OFF under a normal loading condition, and the current is i22=0 [μA]. At this time, the transistor q34 becomes ON, and the current i45 flowing in the transistor q47 is sufficiently drawn by the transistor q34, so that there is formed a bypass extending from the transistor q47 via the transistor q34 to 13. Thus, the relationship between them is as follows.

$$i40=i46=i42+i43=30[A] \quad (6)$$

Next, when the overcurrent condition is detected, the transistor q24 becomes ON, so that the current i22 is provided. Since the current i22 which is allowed to pass by the transistor q24 is larger than the current i43 which is allowed to pass by the transistor q43, a collector potential of the transistor q43 becomes a high level of vs-$V_{SAT}$, so that the diode d43 becomes OFF. Thus, the relationship between them is as follows.

$$i40=i46=i42=10\ [\mu A] \quad (7)$$

Note that, at this time, the transistor q34 remains ON.

Further, when the output voltage vo drops so as to be not more than 2.4[V] (vadj=0.6[V]), the transistor q34 becomes OFF. Thus, the current i45 flowing in the transistor q47 flows into a cathode side of the diode d41, and the relationship between them is as follows.

$$i40=i46=i42-i45=2\ [\mu A] \quad (8)$$

Here, supposing that an oscillation frequency fs of an oscillating circuit (not shown) is capacitance Cocs of an oscillation capacitor and an amplitude of an oscillation wave form is Vosc, the relationship between them is as follows.

$$fs=1/T=140/2Cosc \times Vosc \quad (9)$$

Thus, supposing that Cosc=50 [pF] and Vosc=1[V], the oscillation frequency fs is 300 [kHz] in the case where i40=30 [μA], and the oscillation frequency fs is 100 [kHz] in the case where i40=10 [μA], and the oscillation frequency fs is 20 [kHz] in the case where i40=2 [μA].

Here, in the first oscillation frequency changing circuit 10*a*, the current i23 provided from the constant current source f21 is, for example, set to 1 [μA], and the capacitance of the capacitor c21 is set to 150 [pF]. A current passing through the transistor q11 is, for example, of an [mA] order. Thus, a time taken to perform OFF operation of the transistor q21 is shorter than approximately 3 [μsec] which is a switching cycle in an operation at fs=300 [kHz], for example, the OFF operation is completed in approximately 20 [nsec]. On the other hand, an ON operation of the transistor q21 requires the delay time tdf1 taken for the constant current source f21 to charge the capacitor c21 up to an ON voltage ($V_{BE=0.65}$ [V]) of the transistor q21. The delay time tdf1 is as follows.

$$\begin{aligned} tdf1 &= (C21 * V_{BE})/I23 \quad (10) \\ &= (150\,[\mu F] * 0.65\,[V])/1\,[\mu A] \\ &\approx 101\,[\mu\text{sec}] \end{aligned}$$

Thus, the delay time tdf1 is sufficiently longer than 10 [μsec], a switching cycle in operation at fs=100 [kHz]. Thus, in the case where an overcurrent occurs, the switching frequency fs is quickly dropped. Released from the overcurrent condition, the transistor q21 becomes OFF after a time equal to 10 cycles/100 [kHz] elapsed, and the operation is automatically restored to an operation at fs=300 [kHz]. The capacitance etc. of the constant current i23 and the capacitor c21 are suitably set corresponding to the switching frequency fs and a desired delay time tdf1 etc.

As described above, in the switching power unit, the external coil 11 and the capacitor c2 are miniaturized, but the capacitor c21 formed in the integrated circuit requires capacitance to some extent, so that there occurs such a problem that a chip size becomes large. Note that, since the second oscillation frequency changing circuit 10*b* switches a frequency of the oscillator 3 based on the feedback voltage vadj that has been smoothed in the capacitor c2, the foregoing time constant circuit for preventing hunting is not required.

SUMMARY OF THE INVENTION

The object of the present invention is to provide a switching power unit by which it is possible to miniaturize externally provided parts by enabling a switching frequency to be switched and it is possible to miniaturize an integrated circuit itself.

In order to achieve the foregoing object, a switching power unit of the present invention is arranged so that: overcurrent protecting means shortens a switching pulse width so as to restrict an output current when an overcurrent is detected. In the switching power unit, when an overcurrent condition is detected by overcurrent detection means, first oscillation frequency dropping means drops an oscillation frequency of oscillating means from a first oscillation frequency under a normal condition to a second oscillation frequency, and when the overcurrent detection means detects that an output voltage becomes lower than a predetermined level due to the output short circuit etc., second oscillation frequency dropping means drops the second oscillation frequency to a third oscillation frequency.

Therefore, a switching pulse width under a normal condition is short at the first oscillation frequency, so that the switching pulse width sometimes cannot be shortened any more due to the overcurrent protecting operation. However, at the second oscillation frequency, an ON period of the switching element becomes longer than a delay time the switching element takes to turn OFF after the overcurrent condition is detected, so that the overcurrent protecting operation is efficiently performed, thus reducing the output current. Similarly, at the third oscillation frequency, the switching pulse width that has been shortened due to the overcurrent protecting operation is made wider again after the oscillation frequency is dropped from the first oscillation frequency to the second oscillation frequency, so that less influence is exerted by the delay time. Thus, it is possible to prevent increase in the output current brought about by the delay time.

Further, the overcurrent detection output from the overcurrent detection means is given to the first oscillation frequency dropping means via latching means that latches for a period longer than the delay time. Thus, even though a switching pulse is outputted at the first oscillation frequency, the overcurrent detection output is retained, so that the oscillation frequency of the oscillating means is dropped without fail. Then, the oscillation frequency of the oscillating means is restored to the first oscillation frequency after the unit is released from the overcurrent condition and the output voltage smoothed by a capacitor in an output stage is restored to a normal voltage, so that it is not necessary to provide a time constant circuit which prevents hunting. Thus, not only external parts but also a chip size of an integrated circuit itself can be miniaturized.

Further, the switching power unit of the present invention is arranged so that: the second oscillation frequency dropping means sets a level of an output voltage for dropping the second oscillation frequency to the third oscillation frequency according to an input voltage.

Therefore, when the input voltage is large, the oscillation frequency is dropped from a high output voltage, and when the input voltage is small, the oscillation frequency is dropped from a low output voltage, so that it is possible to improve a remarkable decrease/increase characteristic of a current value in a case of a short circuit.

Furthermore, the switching power unit of the present invention is arranged so that: there is provided adjusting means for changing the oscillation frequency according to the input voltage and the output voltage in response to the second oscillation frequency dropping means.

Therefore, when the input voltage is larger than the output voltage, the pulse width is short, so that it is necessary to make the second oscillation frequency lower in particular. If the oscillation frequency is made lower when the output voltage is large, the load current becomes too small, so that it is sometimes desirable that the oscillation frequency is not made lower. With respect to this, it is possible to set the oscillation frequency more appropriately.

Further, the switching power unit of the present invention is arranged so that: there is provided delaying means for forbidding that the first oscillation frequency dropping means change the oscillation frequency upon activation, in relation to the first oscillation frequency dropping means.

Therefore, it is possible to avoid an undesired overcurrent protecting operation brought about by an incoming current of an output capacitor of a large volumetric/low series equivalent resistor upon activation so as to supply the load current sufficiently.

Furthermore, the switching power unit of the present invention is arranged so that: there is provided retaining means for retaining an overcurrent detection output of the latching means, between the latching means and the first oscillation frequency dropping means, in relation to the first oscillation frequency dropping means.

Therefore, even though the switching element is OFF-driven by means of the overcurrent protecting means and the overcurrent detection means does not detect an overcurrent condition temporarily, it is possible to retain the oscillation frequency so that the oscillation frequency remains dropped, so that it is possible to stabilize a pulse width and a cycle of the switching pulse.

Moreover, the switching power unit of the present invention is arranged so that: there is provided dividing means for dividing a reset signal in relation to the latching means.

Therefore, it is possible to stabilize the switching frequency under an overcurrent condition not at the oscillation frequency but at a reset signal frequency.

For a fuller understanding of other object, the nature and advantages of the invention, reference should be made to the ensuing detailed description taken in conjunction with the accompanying drawings.

DESCRIPTION OF THE EMBODIMENTS

One embodiment of the present invention is described as follows based on FIGS. 1 to 5.

Figure 1:
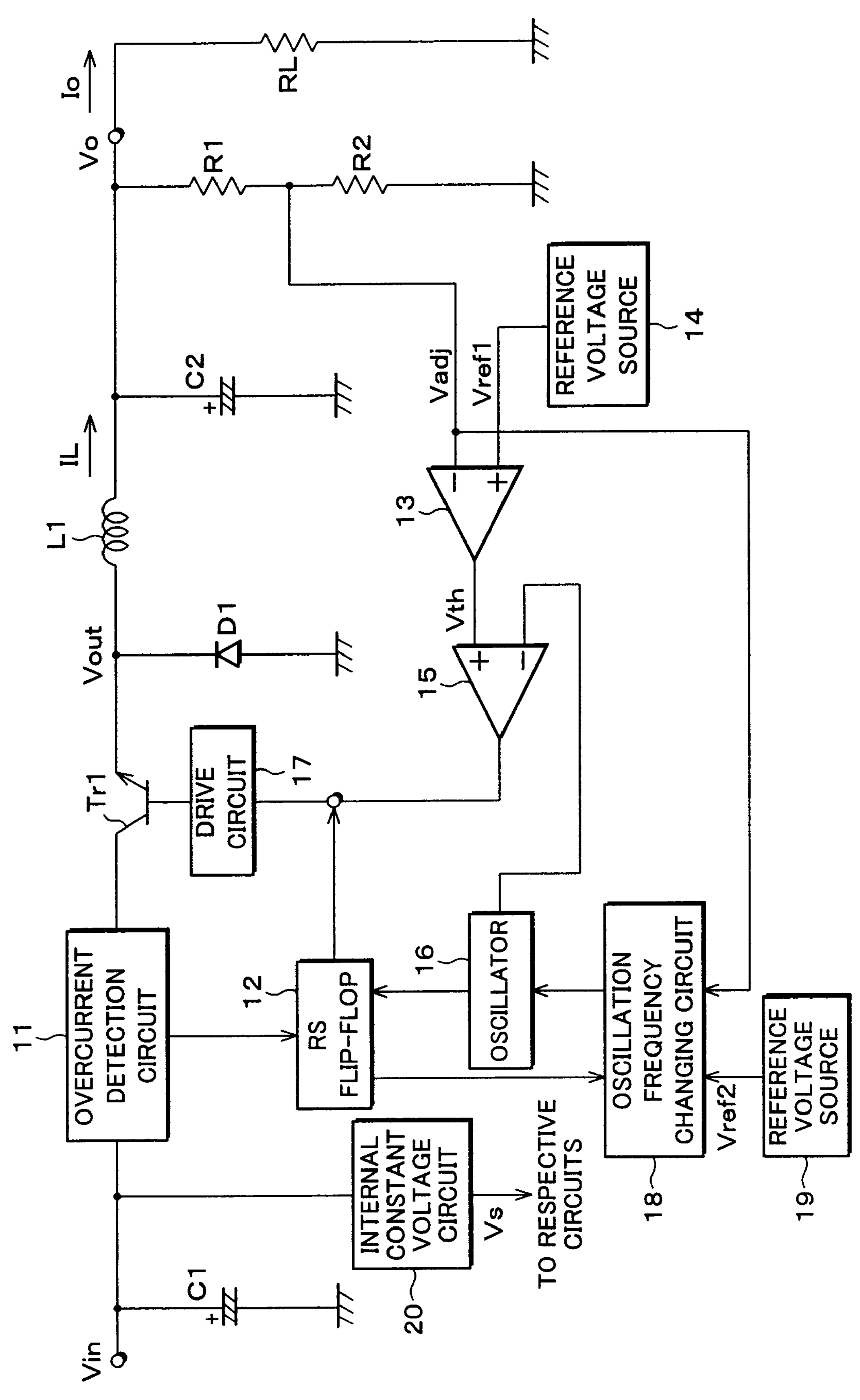
FIG. 1 is a block diagram showing an electric structure of a switching power unit of one embodiment of the present invention.

FIG. 1 is a block diagram showing an electric structure of switching power unit of one embodiment of the present invention. The switching power unit according to the present invention is a chopper type, and is an integrated circuit except for a coil L1 and smoothing capacitors C1 and C2 described later. However, it is often that a diode D1 and resistors R1 and R2 are not included in the integrated circuit.

The switching power unit is, as shown in FIG. 1, provided with an NPN-type bipolar transistor Tr1 for switching an input voltage Vin of 25[V] for example. Between an input terminal and a collector of the transistor Tr1 in a power line, an overcurrent detection circuit 11 intervenes in series, and there is provided a capacitor C1 for smoothing a pulsating current in a preceding stage of the overcurrent detection circuit 11.

The overcurrent detection circuit 11 includes: a detection resistor, connected via the power line to the collector of the transistor Tr1 in series, that performs a current/voltage conversion; and a differential amplifier that receives a voltage between terminals of the detection resistor, wherein the overcurrent detection circuit 11 detects an overcurrent condition when a current flowing between the collector and an emitter of the transistor Tr1 exceeds an overcurrent detection level ICL, and outputs the detecting result as a set signal to an RS flip-flop circuit 12 which functions as latching means described later.

A coil L1 is connected to the emitter of the transistor Tr1 in series. A cathode of the diode D1 is connected to an emitter-side end of the coil L1, and an anode of the diode D1 is grounded. Further, another end of the coil L1 is connected to one end of the output smoothing capacitor C2 and grounded via the resistors R1 and R2 connected to each other in series. Further, another end of the coil L1 is grounded via a load RL provided in parallel to resistors R1 and R2. Another end of the capacitor C2 is grounded. Further, resistance values of the resistors R1 and R2 are, for example, 3 [kΩ] and 1 [kΩ] respectively, and an output voltage is divided by ¼.

When an input voltage Vin that has been smoothed by the capacitor C1 in an input stage is switched, energy is provided to the coil L1, the capacitor C2, and the load RL, due to a voltage Vout that has occurred in the emitter of the transistor Tr1, during a period in which the transistor Tr1 is ON. During a period in which the transistor Tr1 is OFF, energy accumulated in the coil L1 is refluxed by the diode D1 so as to be given to the load RL.

A voltage of a connection point between the resistors R1 and R2 is given to an inverting input of the differential amplifier 13 as a feedback voltage Vadj. Further, in a case where a ratio at which the output voltage Vo is divided by the resistors R1 and R2 is ¼ and the output voltage Vo is 5[V], a reference voltage source 14 for generating a reference voltage Vref1 of 1.25[V] is connected to a non-inverting input of the differential amplifier 13. The differential amplifier 13 outputs a voltage Vth corresponding to a difference between (a) the feedback voltage Vadj obtained by dividing the output voltage Vo by means of the resistors R1 and R2 and (b) the reference voltage Vref1. An output of the differential amplifier 13 is connected to a non-inverting input of a comparator 15. Further, an oscillator 16 is connected to an inverting input of the comparator 15.

The comparator 15 compares a triangle wave from the oscillator 16 with the voltage Vth so that the output voltage Vth of the differential amplifier 13 is a thresh level. The comparator 15 outputs a high level in a case where a level of the triangle wave is lower than the output voltage Vth of the differential amplifier 13. On the other hand, the comparator 15 outputs a low level in a case where the level of the triangle wave is higher than the output voltage Vth of the differential amplifier 13. That is, the comparator 15 outputs a PWM signal for making the transistor Tr1 ON/OFF.

An output of the comparator 15 is connected to the drive circuit 17. The drive circuit 17 ON/OFF-drives the transistor Tr1 based on the PWM signal from the comparator 15. Further, the RS flip-flop circuit 12 is set by a set signal from the overcurrent detection circuit 11 and is reset by a reset signal from the oscillator 16. When the RS flip-flop circuit 12 is set, the RS flip-flop circuit 12 performs an operation for making the transistor Tr1 OFF regardless of the PWM signal.

The output voltage Vo is controlled based on (a) the feedback voltage vadj obtained by dividing the output voltage Vo at the resistance value of the resistors R1 and R2 and (b) the reference voltage Vref1 from the reference voltage 14. First, the differential amplifier 13 outputs a voltage corresponding to a difference between both the voltages, and the outputted voltage is compared with the triangle wave outputted from the oscillator 16 by the comparator 15. Then, the PWM signal that has a pulse width corresponding to an output level of the differential amplifier 13.

Next, when the PWM signal is given to the drive circuit 17, the drive circuit 17 controls ON/OFF of the transistor Tr1 corresponding to a duty D of the PWM signal. Thus, the output voltage Vo is controlled at a constant voltage (5[V]) determined by (a) the reference voltage vref1 and (b) a ratio at which the output voltage is divided by the resistors R1 and R2.

The oscillator 16 generates the triangle wave and generates a reset signal that is to given to a reset terminal of the RS flip-flop circuit 12. In response to the set signal from the overcurrent detection circuit 11, the RS flip-flop circuit 12 transmits a signal for making the transistor Tr1 OFF to the drive circuit 17 that drives the base of the transistor Tr1, and the RS flip-flop circuit 12 keeps on transmitting the signal until the reset signal is inputted.

Further, the oscillator 16 drops an oscillation frequency of the triangle wave from a first oscillation frequency such as 300 [kHz] to a second oscillation frequency such as 150 [kHz], further to a third oscillation frequency such as 30 [kHz], in response to an output of an oscillation frequency changing circuit 18. The third oscillation frequency is set to the minimum frequency away from an audible range. Further, the second oscillation frequency is set as described later.

In the present invention, it is noteworthy that the oscillation frequency changing circuit 18 drops the oscillation frequency of the oscillator 16 from 300 [kHz] to 150 [kHz] in response to an output from the RS flip-flop circuit. While the RS flip-flop circuit 12 is set, the oscillation frequency of 150 [kHz] is dropped, and when the feedback voltage Vadj becomes lower than the reference voltage Vref2 with respect to the reference voltage source 19, for example, than 0.5[V], the oscillation frequency drops from 150 [kHz] to 30 [kHz].

A set terminal S of the RS flip-flop circuit 12 is connected to the overcurrent detection circuit 11, and a reset terminal R is connected to a reset signal output terminal of the oscillator 16, and an inverting output terminal/Q is connected to the oscillation frequency changing circuit 18 and an output terminal of the comparator 15. As to the RS flip-flop circuit 12, when a high level is inputted to the set terminal S, the inverting output terminal/Q is made to be a low level, and this condition can be kept until a high level is inputted to the reset terminal R. Further, as to the RS flip-flop circuit 12, when a high level is inputted to the reset terminal R, the inverting output terminal/Q is made to be a high level, and this condition can be kept until a high level is inputted to the set terminal S. Further, when the set terminal S and the reset terminal R become high levels at the same time, the inverting output terminal/Q becomes a low level.

Note that, the output voltage Vo in the case where the feedback voltage Vadj is 0.5[V] is as follows.

$$Vo=0.5[V]\times(R1+R2)/R2=2.0[V] \tag{11}$$

That is, when the output voltage Vo becomes lower than 2[V], the oscillation frequency of the oscillator 16 drops to 30 [kHz], the lowest value.

A constant voltage Vs generated in an internal constant voltage circuit 20 is provided from the input voltage Vin to the foregoing respective circuits in the switching power unit as a power voltage.

Figure 2:
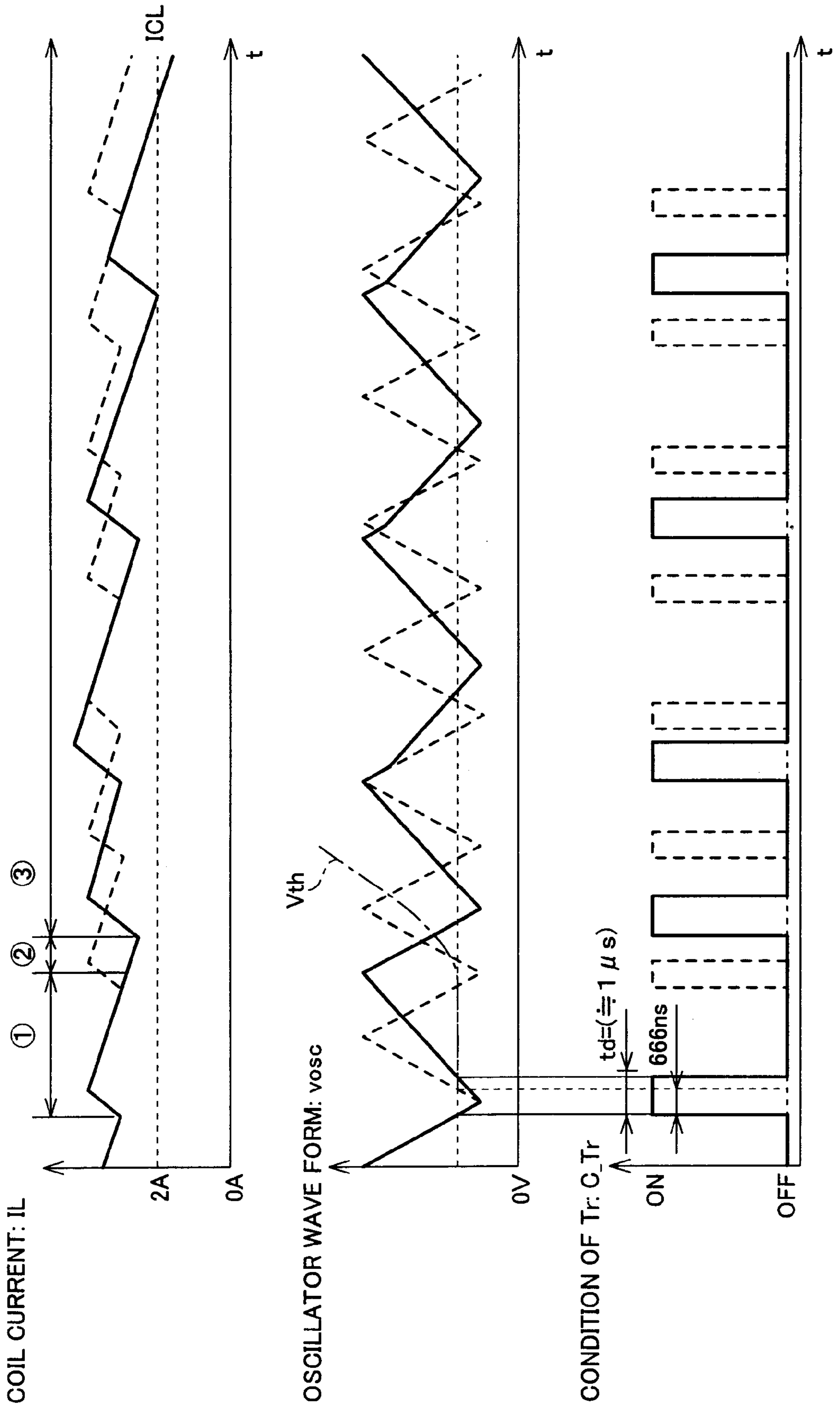
FIG. 2 is a wave form chart for illustrating an operation of the switching power unit shown in FIG. 1.

FIG. 2 is a wave form chart for illustrating an operation of the switching power unit arranged in the foregoing manner. FIG. 2 shows a condition under which a switching frequency fs changes from 300 [kHz] to 150 [kHz]. In the figure, IL refers to a current of the coil L1, and vosc refers to an output wave form of the oscillator 16, and C__Tr refers to ON/OFF operation of the transistor Tr1. In FIG. 2, input voltage Vin=25[V], output voltage Vo=5[V], overcurrent detection level ICL=2[A], load resistance RL=2[Ω], and Vo/RL=2.5[A], so that this shows an overcurrent condition. Then, this condition is detected at the first pulse in FIG. 2.

The oscillation frequency of the oscillator 16 drops as shown by vosc in the figure, and the coil current shown by IL in the figure drops as well, then the coil current becomes lower than the overcurrent detection level ICL. As shown by C__Tr in the figure, the transistor Tr1 is ON when the output level of the oscillator 16 becomes not more than the output voltage Vth of the differential amplifier 13. A switching cycle at this time is 1/300 [kHz]=3.33 [μsec], and the pulse width of the transistor Tr1 at one cycle is as follows.

$$3.3\ [\mu sec]\times Vo/Vin=666\ [nsec] \tag{12}$$

At this time, a delay time td of an overcurrent detection path (≈1 [μsec])>the switching pulse width.

When an overcurrent is detected in the first pulse, the transistor Tr1 becomes ON at a time when the RS flip-flop circuit 12 is reset at a peak of the triangle wave from the oscillator 16, and the switching cycle extends to 6.66 [μsec] corresponding to 150 [kHz] of the switching frequency that should be dropped. Further, the pulse width becomes 1.33 [μsec], so that it becomes possible to perform an overcurrent protecting operation by means of the overcurrent detection circuit 11 and the RS flip-flop circuit 12 as td<switching pulse width.

That is, at a period ①, the overcurrent detection circuit 11 detects an overcurrent concurrently with making the transistor Tr1 ON, and after an operation for setting the RS flip-flop circuit 12 and the delay time td, an operation for making the transistor Tr1 OFF is performed. This operation is performed at high frequency and the pulse width of the transistor Tr1<the delay time td. Thus, although it is impossible to make the pulse width small, the oscillation frequency becomes low (a slope of the oscillator wave form shown by vosc in FIG. 2 becomes gradual) when the RS flip-flop circuit 12 is set. Consequently, a period in which the transistor Tr1 is OFF becomes longer.

Next, at a period ②, since the period in which the transistor Tr1 is OFF becomes longer, the duty of the transistor Tr1 becomes smaller, so that the output voltage Vo drops and the output voltage Vth of the differential amplifier 13 increases. When Vth>the oscillator wave form, the transistor Tr1 becomes ON.

At a period ③, the output voltage Vth of the differential amplifier 13 increases so as to exceed the maximum value of the output voltage of the oscillator 16. A switching operation in this case is as follows. When a reset signal outputted at the maximum value of an oscillator output is inputted to the RS flip-flop circuit 12, the transistor Tr1 becomes ON. When the overcurrent detection circuit 11 detects an overcurrent and the outputted reset signal is inputted to the RS flip-flop circuit 12, the transistor Tr1 becomes OFF after the delay time td elapsed. The switching frequency at this time becomes lower than a frequency under a normal condition. Supposing that this lowered switching frequency is 150 [kHz] as described above, the relationship between them is as follows.

$$Vo=Vin\times 1\ [\mu sec]\times 150\ [kHz]=3.75[V] \tag{13}$$

The output voltage Vo and an output current Io drop together.

In FIG. 2, a broken line shows a wave form in a case where the switching frequency is not switched. In a case where the switching frequency is not switched, an overcurrent is detected in concurrence with turning ON of the transistor Tr1 under an overcurrent condition, and OFF operation is performed after the delay time td. However, a normal ON time of the transistor Tr1 is 666 ns as described above and the switching pulse width can not be made smaller, so that the output voltage Vo does not drop and the coil current IL does not drop. In a case where the load RL becomes smaller, the load current Io increases, so that there is a possibility that the transistor Tr1 will be damaged.

Figure 3:
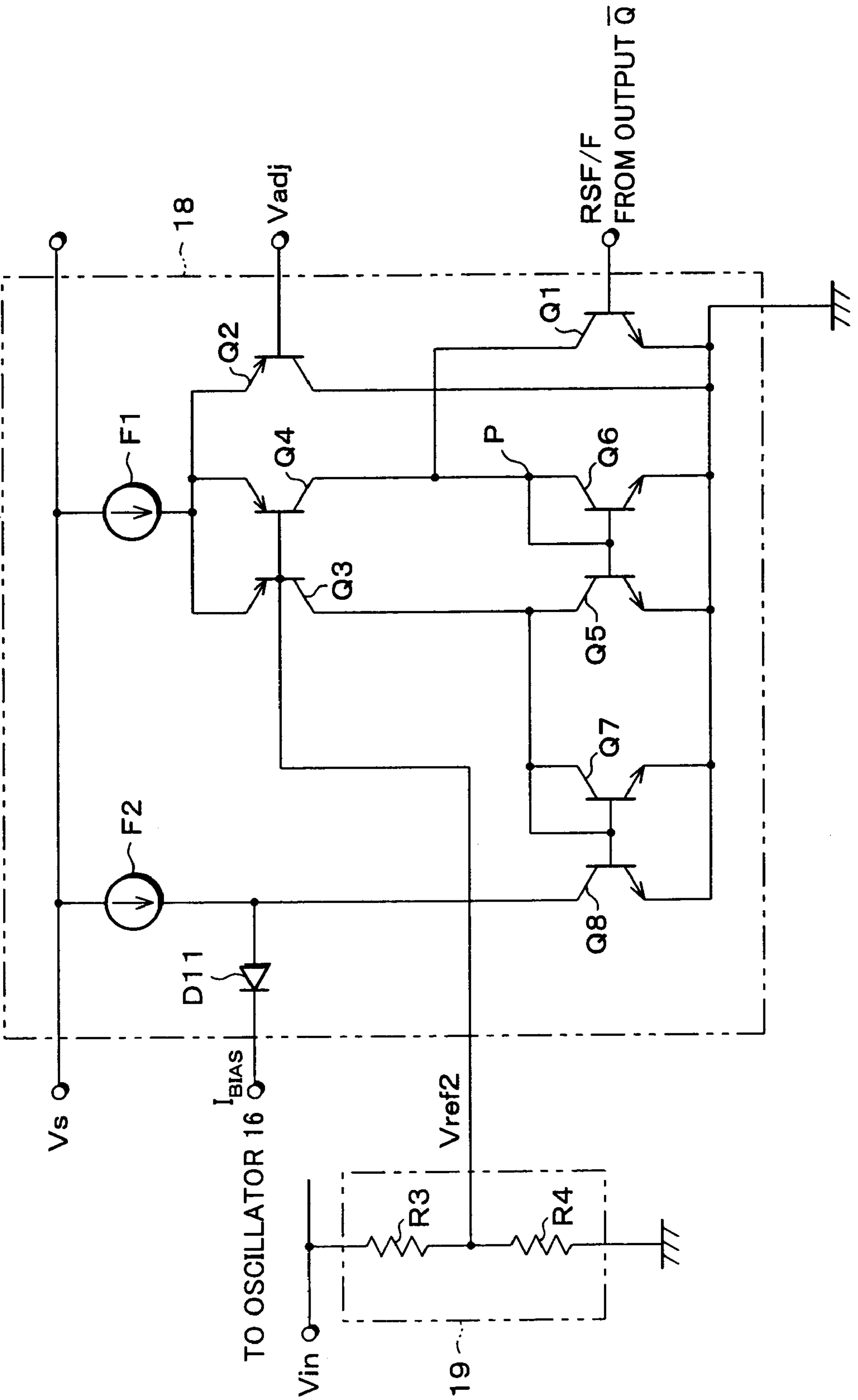
FIG. 3 is an electric circuit diagram showing a concrete structure of an oscillation frequency changing circuit and a reference voltage source of the switching power unit shown in FIG. 1.

FIG. 3 is an electric circuit diagram showing a concrete structure of the oscillation frequency changing circuit 18 and a reference voltage source 19. The oscillator 16 changes an oscillation frequency as described above according to a bias current $I_{BIAS}$ outputted from the oscillation frequency changing circuit 18. The oscillation frequency changing circuit 18 includes: an NPN transistor Q1 for performing ON/OFF operation when a base of the NPN transistor Q1 receives the inverting input/Q of the RS flip-flop circuit 12; a PNP transistor Q2 for performing ON/OFF operation when a base of the PNP transistor Q2 receives the feedback voltage Vadj; PNP transistors Q3, Q4, and NPN transistors Q5 and Q6 that operate as a comparator in combination with the transistor Q2; output NPN transistors Q7 and Q8; constant current sources F1 and F2; and a backflow preventing diode D11.

As to the transistors Q3 and Q4, each of their emitters are connected to the constant current source F1, and the reference voltage Vref2 is given to their bases respectively, and their collectors are connected to the transistors Q5 and Q6 respectively. As to the transistors Q5 and Q6, their bases are connected to the collector of the transistor Q6 so as to arrange a current mirror circuit, and their emitters are grounded. The transistor Q2 is provided in parallel to the transistors Q3 and Q4, and its emitter is connected to the constant current source F1, and its collector is grounded. The transistor Q1 is provided so that the collector current to the transistor Q6 is bypassed. The collector current of the transistor Q3 is given to the transistor Q7 provided in parallel to the transistor Q5, and a current whose amount is in proportion to an amount of a current flowing in the transistor Q7 is supplied by the transistor Q8 that constitutes a current mirror circuit, so that the current is drawn from a constant current source F2. A difference between the current from the constant current source F2 and the current flowing in the transistor Q8 is a bias current $I_{BIAS}$ that flows via the diode D11 to the oscillator 16.

Under a normal condition, Vadj>Vref2, so that a current flows to the transistors Q3 and Q4. Further, when the inverting output/Q of the RS flip-flop circuit 12 becomes a high level, the transistor Q1 becomes ON so that a current flowing from the transistor Q4 to the transistor Q6 is bypassed. Thus, a base current of the transistors Q6 and Q5 becomes 0, so that a current that flows in the transistors Q6 and Q5 becomes 0. A whole current from the constant current source F2 flows in the transistors Q7 and Q8, so that the bias current $I_{BIAS}$ becomes 0.

On the other hand, under an overcurrent condition, the inverting output/Q of the RS flip-flop circuit 12 becomes a low level, so that the transistor Q1 becomes OFF. Thus, since a current flows in the transistors Q6 and Q5, and the collector current of the transistor Q3 partially flows to the transistor Q7 so as to flow to the transistor Q8, the collector current of the transistor Q8 is more restricted compared with the normal condition, and the bias current $I_{BIAS}$ is partially provided from the current of the constant current source F2. Under an output short circuit condition under which the output voltage Vo is not more than 2.0[V], the transistor Q2 becomes ON. Thus, a current that flows in the transistors Q3 and Q4 so as to flow in the transistors Q5 and Q6 is bypassed, and a current that flows in the transistors Q7 and Q8 are further reduced, so that the bias current $I_{BIAS}$ becomes largest.

In this manner, the bias current $I_{BIAS}$ changes, so that it is possible to change the oscillation frequency. Note that, not the feedback voltage Vadj but the output voltage Vo may be directly given to the transistor Q2 that detects short circuit.

At 300 [kHz] which is the first oscillation frequency, the bias current $I_{BIAS}$ is 0. Thus, the oscillation frequency of the oscillator 16 is adjusted so as to be the first oscillation frequency by using an emitter ratio of the transistor of the oscillator 16 and the like. Further, the oscillation frequency of the oscillator 16 is adjusted so as to be the second and third oscillation frequencies by adjusting an emitter ratio of the transistors Q3 to Q6 and current values in the constant current sources F1 and F2. For example, in a case where the second oscillation frequency is 150 [kHz], an area ratio of the transistors Q3 and Q4 is set to 3:1, and an area ratio of the transistors Q5 and Q6 is set to 1:1.

Here, how to set the second oscillation frequency is described. In order to satisfy a condition under which the overcurrent protecting function operates, that is, the switching pulse width becomes longer than the delay time td in the overcurrent detection path, the switching frequency fs is made low as described above. However, when the switching frequency fs is made low, the load current Io becomes small under a condition under which the output voltage Vo is high upon overcurrent protecting operation. Thus, it is necessary to set the second oscillation frequency so that it is possible to restrict a sudden drop of the load current Io even when the output voltage Vo is higher than a predetermined voltage.

Figure 4:
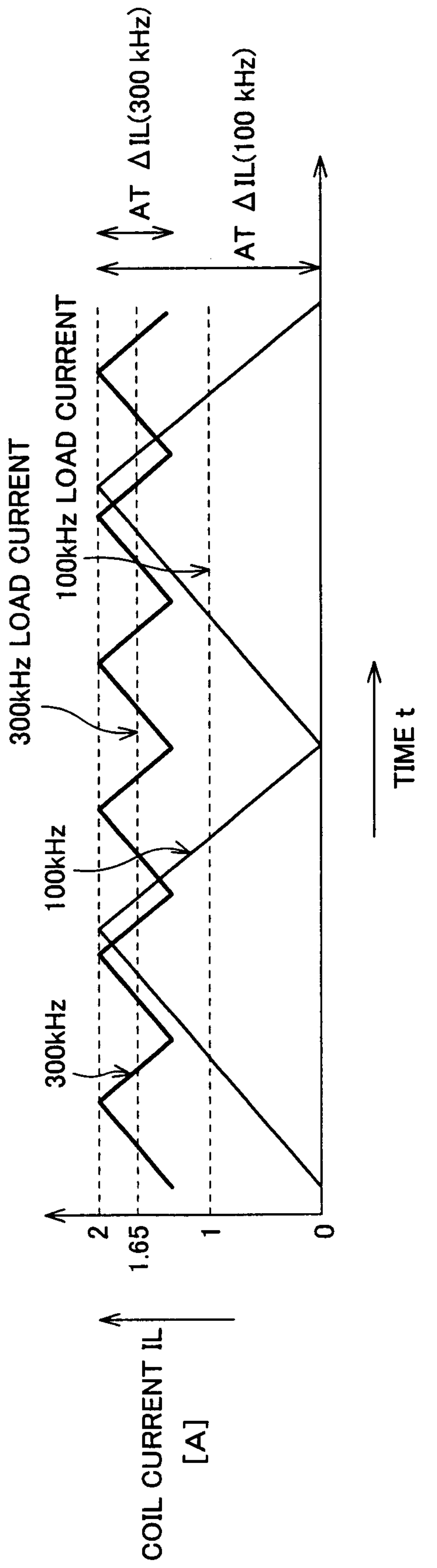
FIG. 4 is a wave form chart showing a coil current under an overcurrent condition in the switching power unit shown in FIG. 1.

FIG. 4 shows the coil current IL under the overcurrent condition. Under the overcurrent condition, the transistor Tr1 becomes ON at the oscillation frequency of the oscillator 16. Alternately, the reset signal is inputted to the RS flip-flop circuit 12, so that the transistor Tr1 becomes ON. Further, under the overcurrent condition, the transistor Tr1 becomes OFF when reaching an overcurrent detection level ICL. In FIG. 4, a positive slope of the coil current IL is (Vin−Vo)/L, and a negative slope of the coil current IL is −Vo/L, and they are constant regardless of the switching frequency fs. When the switching frequency fs is low with the same slope kept, a load current value (broken line in FIG. 4) which is equal to a mean value of the coil current IL drops as the switching frequency fs becomes smaller.

For example, when Vin=12[V], Vo=5[V], L=10 [$\mu$H], ICL=2[A], a ripple current ΔIL and the load current Io under the overcurrent condition are as follows.

$$\Delta IL = Vo/L \times Vo/Vin/fs \quad (14)$$

$$Io = ICL - \Delta IL/2 \quad (15)$$

Thus, as shown in FIG. 4, the load current Io with fs=300 [kHz] is approximately 1.65[A], and when the switching frequency drops to fs=100[kHz] for example, the load current Io drops to approximately 1[A].

Figure 5:
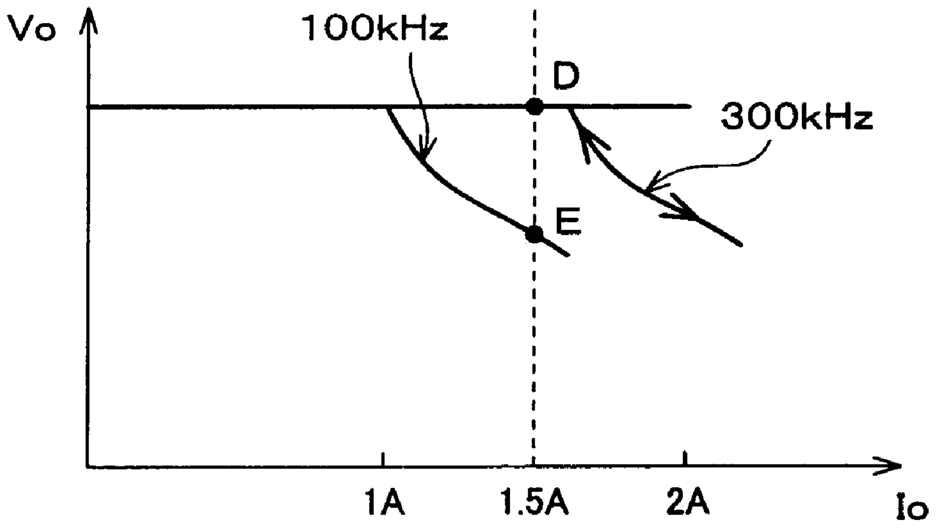
FIG. 5 is a graph showing an operation characteristic of the switching power unit shown in FIG. 1.

FIG. 5 shows a characteristic of the output voltage Vo-output current Io at this time. Also in a case where the output current Io exceeds 2[A] due to an incoming current of a capacitor or an output defect upon initial rise as a switching power source, it is desirable that the output voltage Vo recurs when released from the abnormal condition. If the load current under a normal loading condition is 1.5[A], the load current under the overcurrent condition is approximately 1.65[A] in a case where fs=300 [kHz]. Even though the output voltage Vo once drops, the output voltage Vo returns to an operation point D of normal loading so as to be 5[V] when released from the overcurrent condition. However, in a case where fs=100 [kHz], when an overcurrent protecting is once performed, the overcurrent protecting sometimes remains performed at an operation point E.

Figure 14:
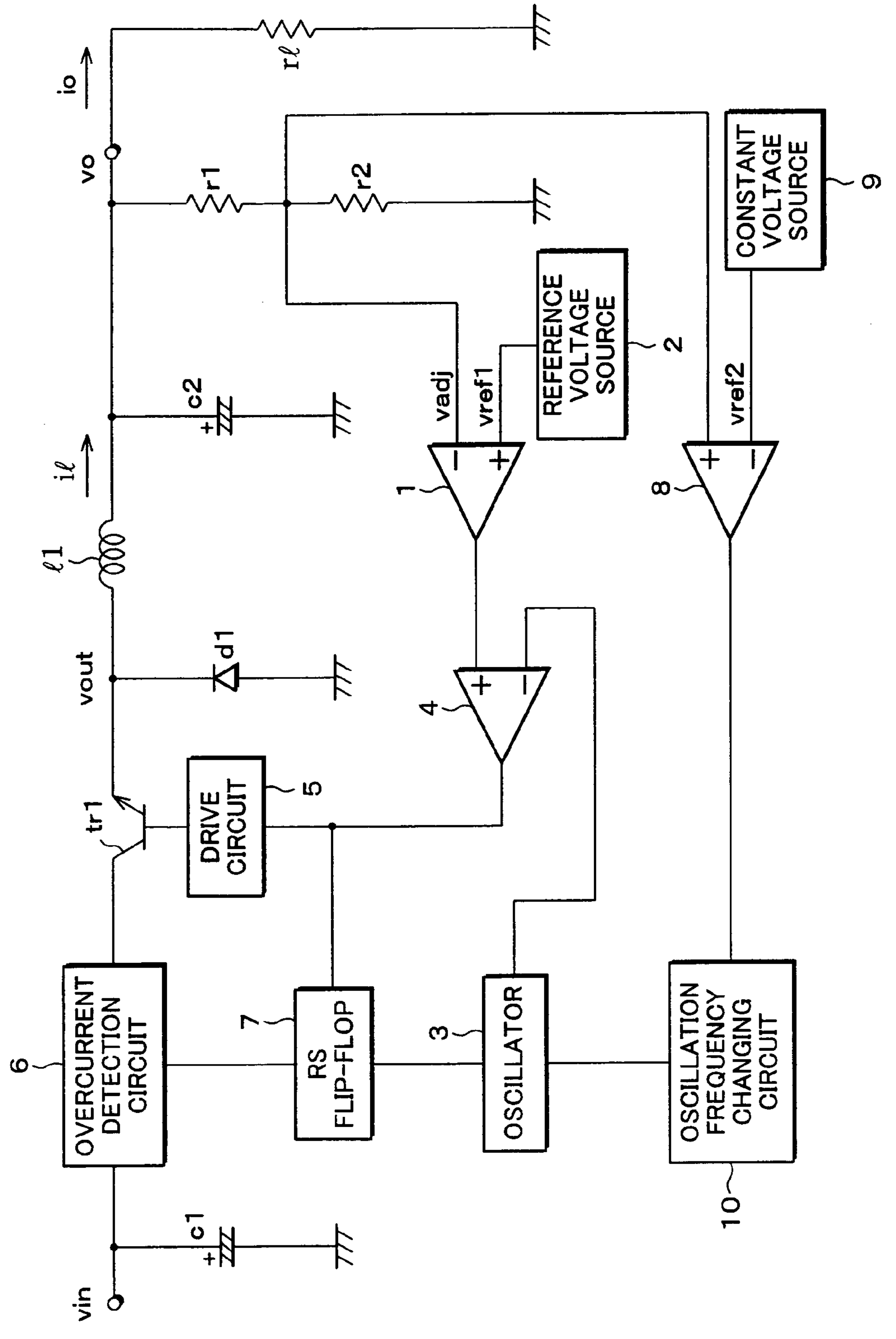
FIG. 14 is a block diagram showing an electric structure of a switching power unit of another prior art.
Figure 15:
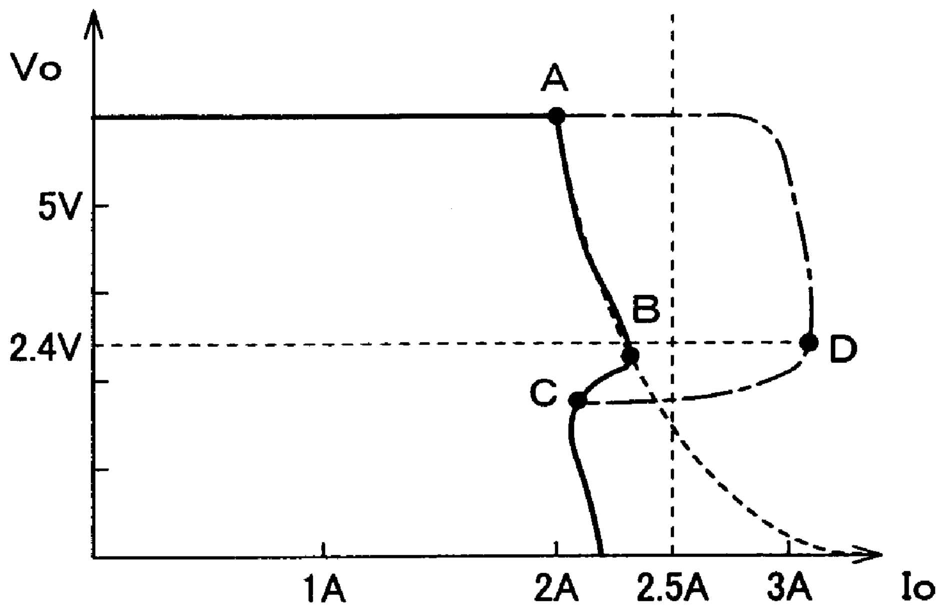
FIG. 15 is a graph showing an operation characteristic of the switching power unit shown in FIG. 14.

That is, the ripple current ΔIL is in proportion to the square of the output voltage Vo as shown in FIG. 14. Thus, when the switching frequency fs is made low enormously while the output voltage Vo being high, the load current Io drops, so that this is not preferable. Therefore, when the second oscillation frequency in a case where the output voltage Vo exceeds a predetermined voltage, that is, in a case where Vadj>Vref2 is set so that a load current under the overcurrent condition is larger than a load current under a normal condition.

Next, the reference voltage source 19 is described. The reference voltage source 19 includes the resistors R3 and R4 for dividing the input voltage Vin so as to output the divided input voltage Vin as the reference voltage Vref2. For example, R3=19 [kΩ], R4=1 [kΩ]. Thus, the input voltage Vin is divided at 1/20, and when Vin=10[V], Vref2=0.5[V], and when Vin=20[V], Vref2=1[V]. In this manner, the reference voltage Vref2 is set according to the input voltage Vin.

Figure 17:
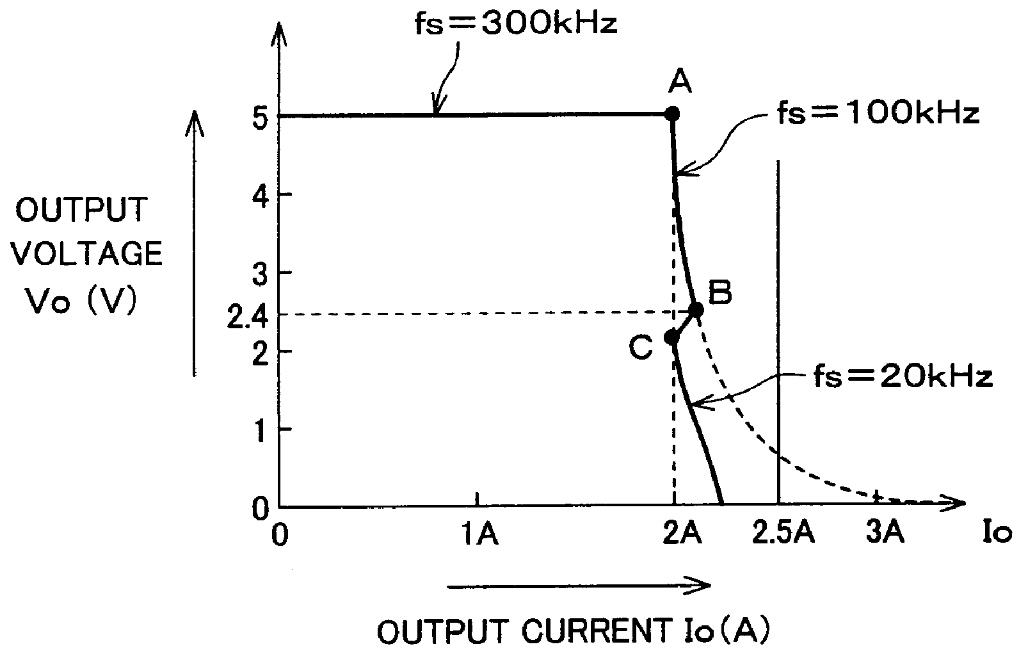
FIG. 17 is a graph showing an operation characteristic of the switching power unit shown in FIG. 16.
Figure 18:
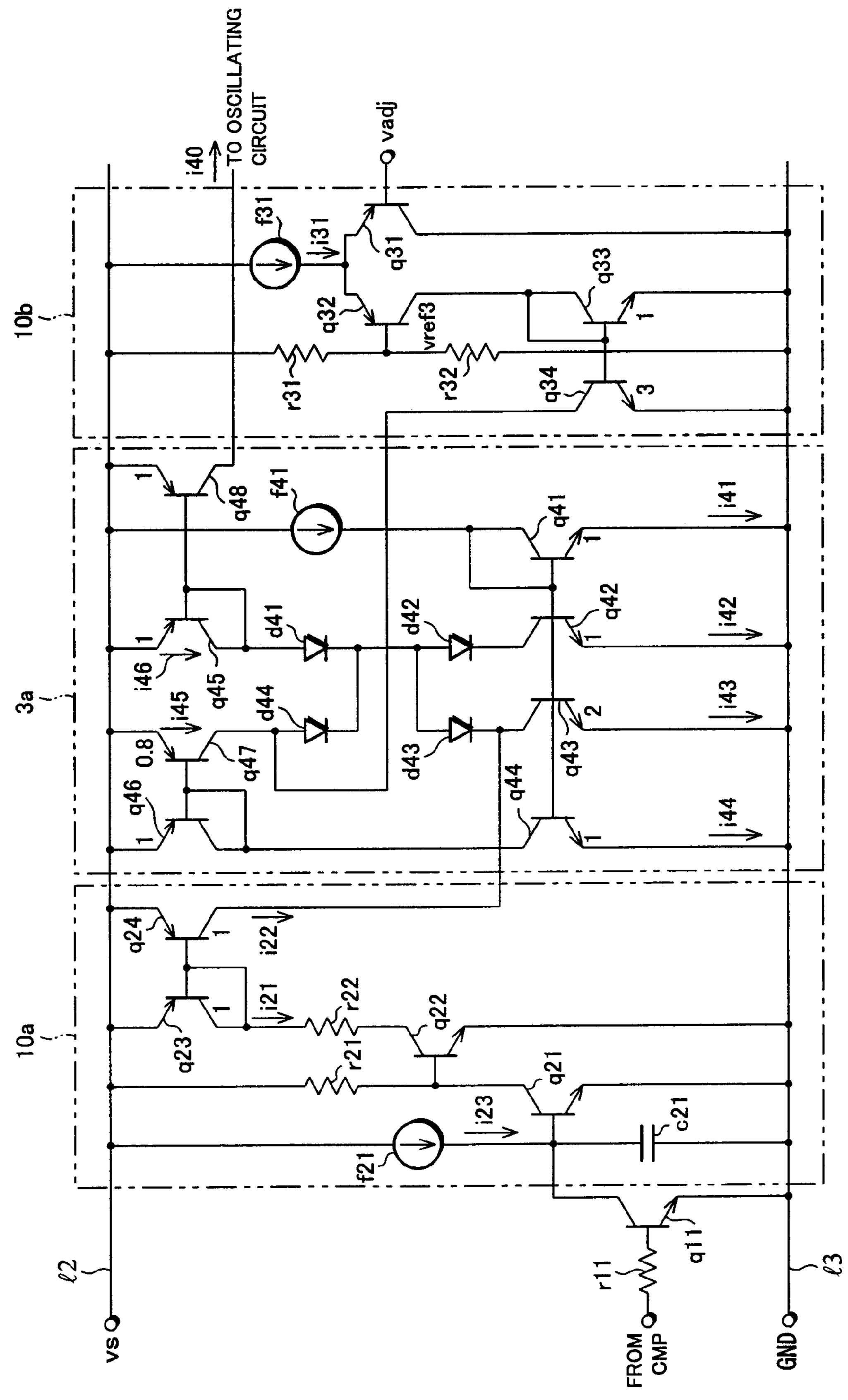
FIG. 18 is an electric circuit diagram showing a concrete structure of a first oscillation frequency changing circuit and a second oscillation frequency changing circuit of the switching power unit shown in FIG. 16.

The operation characteristic of the output voltage Vo-output current Io of the switching power unit described above is similar to the operation characteristic indicated in FIG. 17, but the operation characteristic indicated in FIG. 17 has the following defect: in a case where the input voltage Vin is low and the output voltage Vo is high, a current value at C point is small when the switching frequency fs is low, so that the switching power unit is hard to be released from the overcurrent condition. While, in a case where the input voltage Vin is high and the output voltage Vo is low, a current value at B point becomes extremely large when the switching frequency fs is high, so that this is not preferable.

For example, supposing that Vref2=1.25 [v], Vo=5[V], R3=1[kΩ], R4=[3 kΩ], L1=30 [$\mu$H], ICL=2[A], the second oscillation frequency is 150 [kHz], and the third oscillation frequency is 30 [kHz]. Here, when the Vref2 is fixed to 1.0[V], Vo=4[V], a current value at C point is such that: when Vin=10[V], Io=1.1[A], and when Vin=20 [v], Io=1.6 [A] based on the foregoing expressions 14 and 15. Further, a current at B point is such that: when Vin=10 [v], Io=1.8 [A], and when Vin=20[A], Io=1.9[A].

Thus, in a case where Vref2 is fixed to 1.0[V], a current at C point is small when the input voltage Vin is so low that Vin=10[V], so that this is not preferable.

While, when Vref2 is fixed to 0.5[V], Vo=2[V], and when Vin=10[V], a current at C point is such that: Io=1.8[A], so that there is no problem. However, a current at B point is such that: supposing that the delay time in the overcurrent protecting is 1 [$\mu$sec] in a case where Vin=20[V], $$\text{Input voltage} = 20[V]\times 1[\mu\text{sec}]\times 150[\text{kHz}]\times Io = 3[V]\times Io \tag{16}$$

and $$\text{output voltage} = 2[V]\times Io \tag{17}$$

Thus, input voltage>output voltage, so that the current value at B point becomes extremely large.

Then, according to the present invention, the following operations are performed. The reference voltage Vref2 is generated by using the input voltage Vin, and the Vref2 is set to be high since the current value at C point is hard to be small when the input voltage Vin is large, and the frequency is dropped from the high output voltage Vo. The reference voltage Vref2 is set to be low since the current value at B point is hard to be large when the input voltage Vin is small, and the frequency is dropped from the low output voltage Vo. By performing the foregoing operations, the drop in the current value at C point is restricted and the increasing characteristic of the current at B point is improved.

Figure 16:
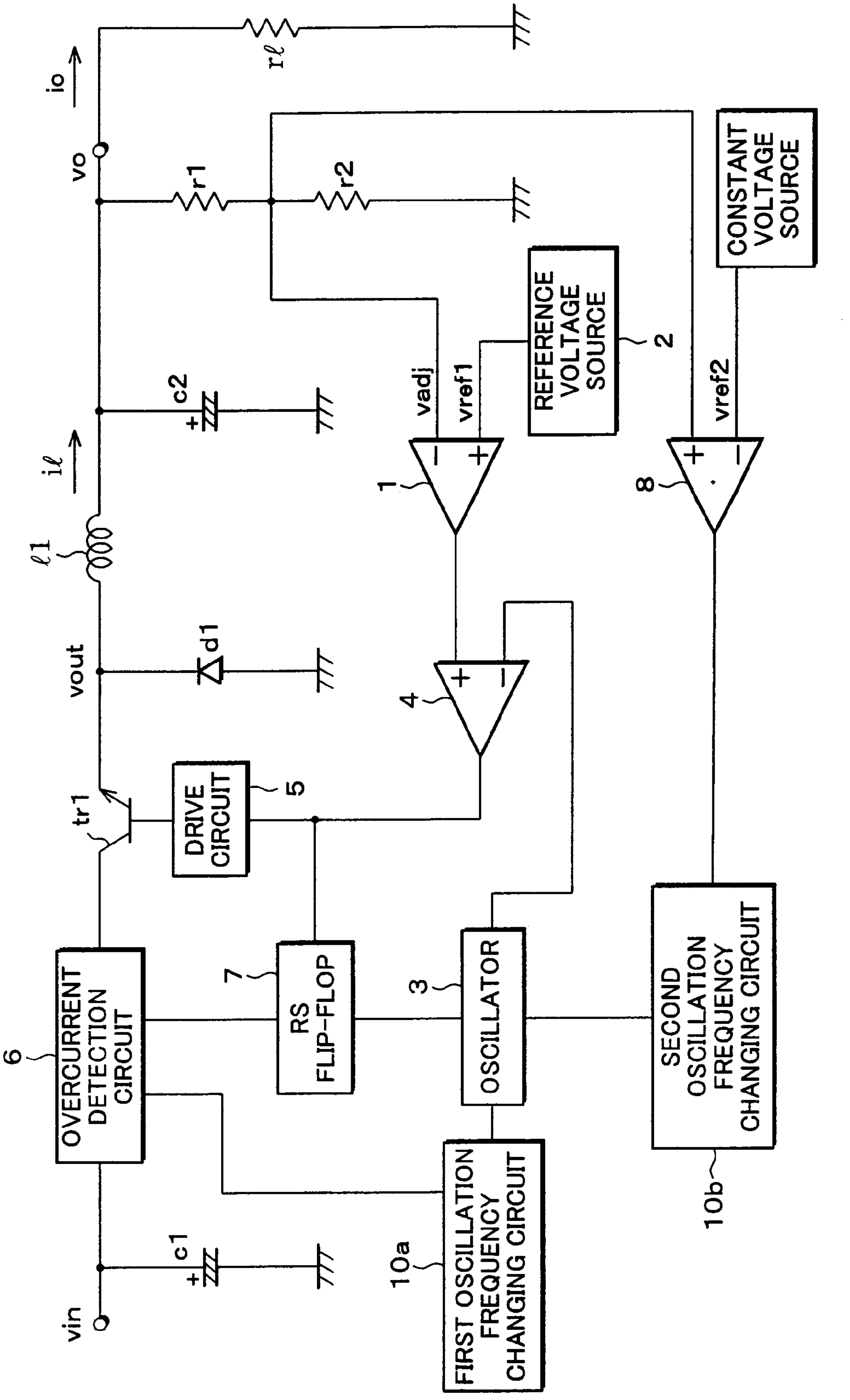
FIG. 16 is a block diagram showing an electric structure of a switching power unit of still another prior art.

As described above, in the switching power unit of the present invention, the oscillation frequency changing circuit 18 does not drop the oscillation frequency of the oscillator 16 in response to an output from the overcurrent detection circuit 11 unlike the conventional switching power units shown in FIG. 16 etc, but the oscillation frequency changing circuit 18 drops the oscillation frequency of the oscillator 16 in response to an output from the RS flip-flop circuit 12 which functions as latching means set by a set signal from the overcurrent detection circuit 11, so as to retain an output of the latching means for a time longer than the delay time td in the overcurrent detection path.

Thus, even though a switching pulse is outputted at the first oscillation frequency, the overcurrent detection output is retained, so that the oscillation frequency of the oscillator 16 drops without fail. Although the RS flip-flop circuit 12 is reset at each peak of the triangle wave from the oscillator 16, the oscillation frequency of the oscillator 16 returns to the normal oscillation frequency after the output voltage Vth of the differential amplifier 13 shown in FIG. 2 becomes not more than the foregoing triangle wave level. Here, in order to cause the output voltage Vth to be not more than the triangle wave level, it is necessary that the feedback voltage Vadj obtained by dividing the output voltage Vo smoothed in the smoothing capacitor C2 is substantially equal to the reference voltage Vref1. Thus, the oscillation frequency of the oscillator 16 returns to the normal oscillation frequency after the output voltage Vo that has been dropped due to the overcurrent returns to a normal voltage such as 5[V].

Consequently, as clear from the circuit diagram shown in FIG. 3, the oscillation frequency changing circuit 18 does not require a time constant circuit for preventing hunting that takes place since the switching power unit is released from the overcurrent condition until the unit is restored to the normal condition. Thus, it is possible to obtain not only such an advantage that the external coil L1 and capacitor C2 are miniaturized by using the high frequency of 300 [kHz], but also such an advantage that the chip size of the integrated circuit itself is miniaturized.

Further, the second oscillation frequency is such a level that the load current Io is not made small largely not only in a case of satisfying a condition under which the switching pulse width is longer than the delay time td in the overcurrent detection path, but also in a case where the switching frequency fs is low. Thus, even though the output voltage Vo is higher than a predetermined voltage as described above, it is possible to restrict a sudden drop of the load current Io.

Further, the reference voltage source 19 divides the input voltage Vin so as to generate the reference voltage Vref2 for detecting short circuit. Thus, when the input voltage Vin is large, the oscillation frequency is dropped from the high output voltage Vo, and when the input voltage Vin is small, the oscillation frequency is dropped from the low output voltage Vo, so that it is possible to improve a significant increase/decrease characteristic of the current value in case of short circuit.

Figure 6:
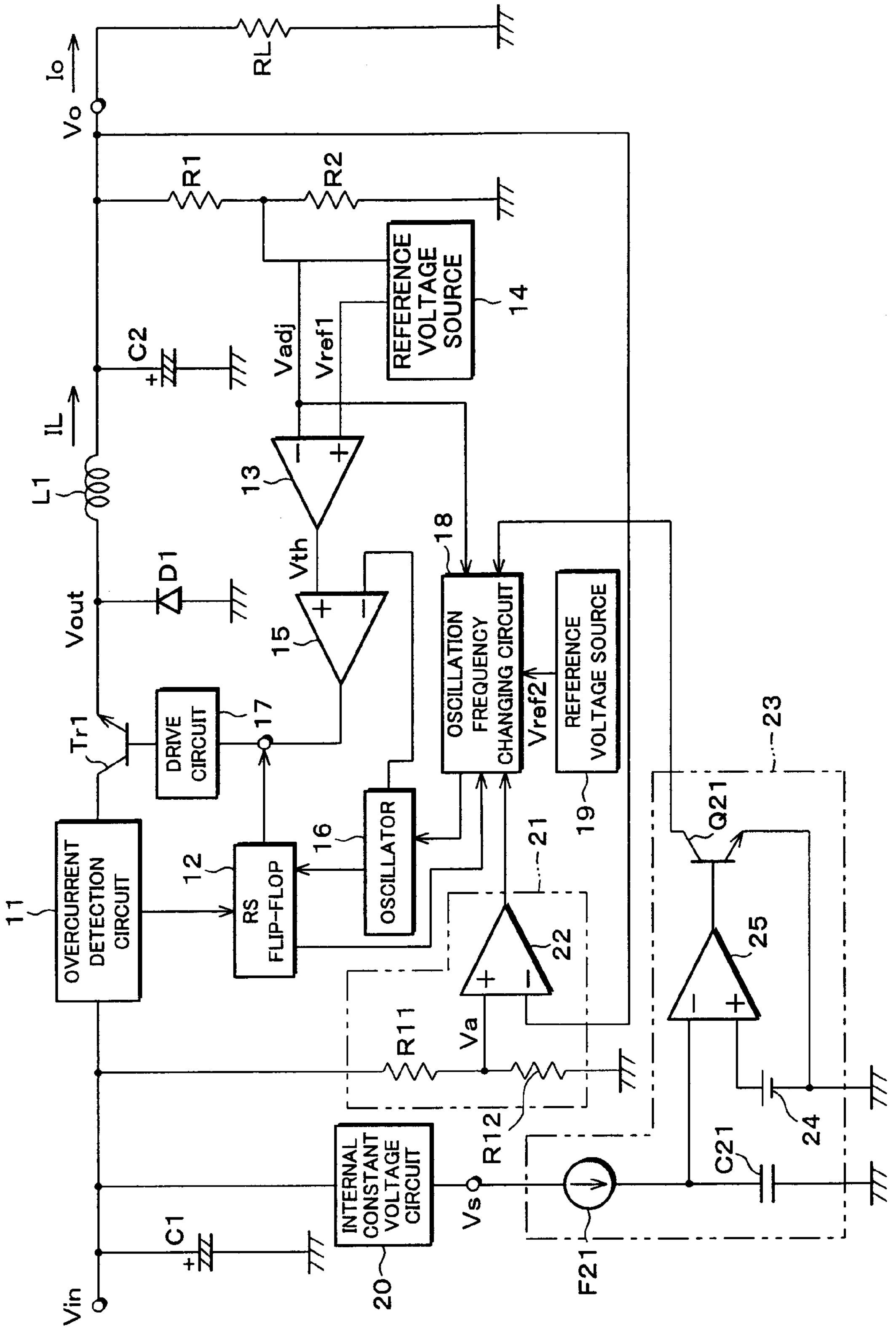
FIG. 6 is a block diagram showing an electric structure of a switching power unit of another embodiment of the present invention.
Figure 7:
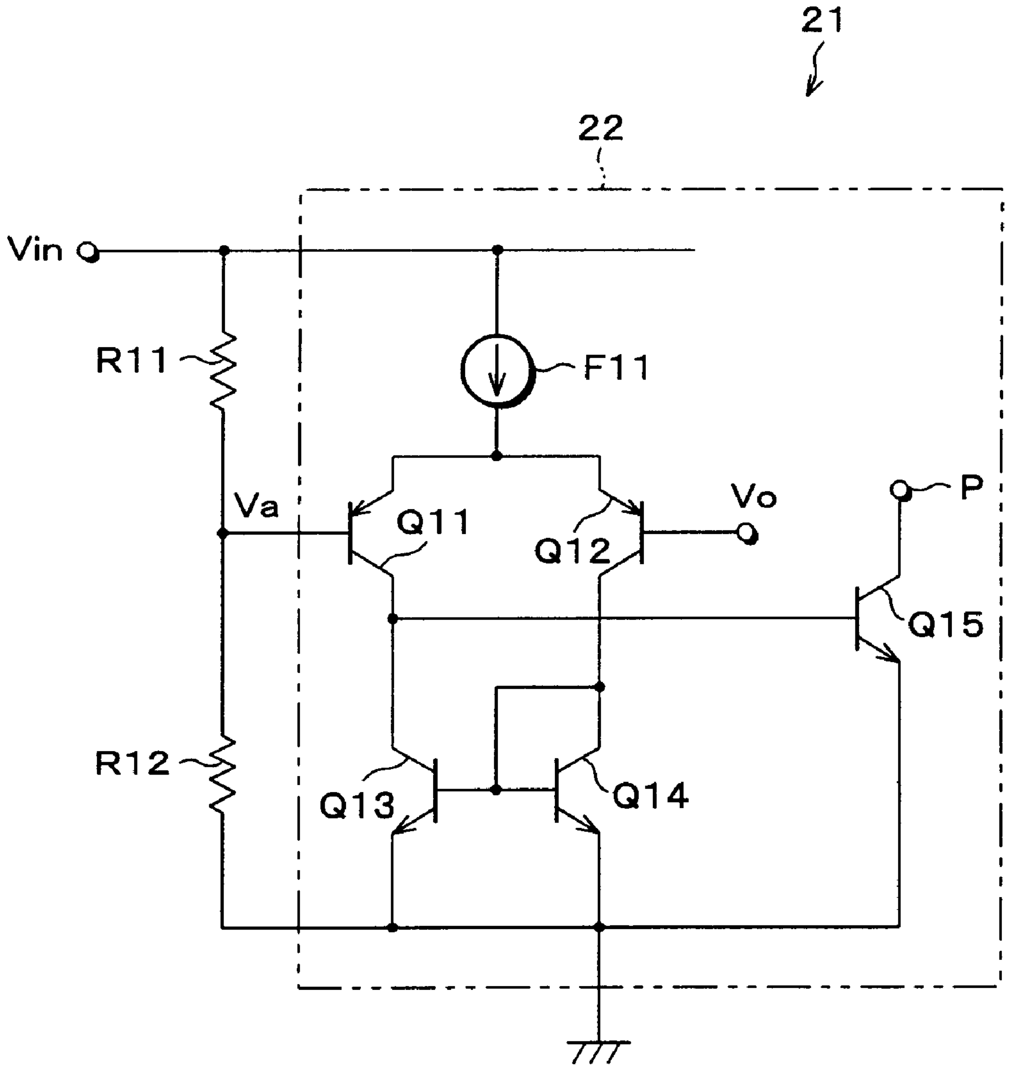
FIG. 7 is an electric circuit diagram showing a concrete structure of a differential amplifier of the switching power unit shown in FIG. 6.

The following is a description of another embodiment of the present invention referring to FIG. 6 and FIG. 7.

FIG. 6 is a block diagram showing an electric structure of a switching power unit of another embodiment of the present invention. The switching power unit is similar to the switching power unit shown in FIG. 1, and the same reference numerals are given to corresponding portions and descriptions thereof are omitted.

It is noteworthy that there is provided an adjusting circuit 21 in association with the oscillation frequency changing circuit 18 since the oscillation frequency changes according not only to the input voltage Vin but also to the output voltage Vo in the switching power unit. The adjusting circuit 21 schematically includes: resistors R11 and R12 for dividing the input voltage Vin; and a differential amplifier 22 for generating a voltage Vb according to the dividing value Va and the output voltage Vo.

FIG. 7 is an electric circuit diagram showing a concrete structure of the differential amplifier 22. The differential amplifier 22 includes: PNP transistors Q11 and Q12 for constituting a pair of differentials; NPN transistors Q13 and Q14 for constituting the current mirror circuit; a transistor Q15 for output; and a constant current source F11.

The dividing value Va obtained by dividing the input voltage Vin by means of the resistors R11 and R12 is inputted to the base of the transistor Q11, and the output voltage Vo is inputted to a base of the transistor Q12, and a current from the constant current source F11 is given to an emitter of the transistor Q12. A collector of the transistor Q11 is grounded via the transistor Q13. A collector of the transistor Q12 is connected to a collector and a base of the transistor Q14, and is connected to a base of the transistor Q13. A collector of the transistor Q13 is connected to a base of the transistor Q15, and a collector of the transistor Q15 is connected to P point on the collector side of the transistor Q6 in the oscillation frequency changing circuit 18 shown in FIG. 3.

For example, supposing that resistance R11=6 [KΩ], resistance R12=4 [KΩ], constant current source F11=10 [$\mu$A], constant current source F2 of FIG. 3=27 [$\mu$A], constant current source F1=54 [$\mu$A], and an emitter ratio of the transistors Q3 and Q4 is 5:4, and a normal oscillation frequency is 300 [kHz], coil L1=30 [$\mu$H], the overcurrent detection level ICL=2[A], and the delay time td=1 [$\mu$sec]. In this case, when an overcurrent is detected under a condition of Vin=20[V] and Vo=2[V], a current from the constant current source F11 flows from the transistor Q12 to the side of the transistor Q14, and a collector potential of the transistor Q13, that is, a base potential of the transistor Q15 becomes low, so that the transistor Q15 becomes OFF.

At this time, in FIG. 3, 30 [$\mu$A](=54 [$\mu$A]×5/9) flows into the transistor Q3, and 24 [$\mu$A] flows into the transistor Q5, and 6 [$\mu$A] flows into the transistor Q7. Thus, 21 [$\mu$A] flows into the bias current $I_{BIAS}$, and the oscillation frequency becomes, for example, 90 [kHz]. At this time, the switching pulse width is as follows.

$$Vo/VIN/90\ [kHz]=1.1\ [\mu sec] \tag{18}$$

Thus, it is possible to satisfy the foregoing condition under which the switching pulse width is longer than the delay time td in the overcurrent detection path.

However, even though the oscillation frequency is set to, for example, 100 [kHz], Io is 1.2[A] in accordance with the expressions 14 and 15 while using the same arrangement under a condition of Vin=10[V] and Vo=5[V], so that it becomes impossible to make the load current larger. Then, the adjusting circuit 21 detects the input voltage Vin and the output voltage Vo so as to determine the switching frequency in overcurrent detection appropriately.

When an overcurrent is detected under a condition of Vin=10[V] and VO=5[V], a current from the constant current source F11 flows into the transistor Q11 so as to be a base current of the transistor Q15, so that the transistor Q15 becomes ON. At this time, a whole current of the transistor Q4 flows into the transistor Q15. Thus, a 30 [$\mu$A] collector current of the transistor Q7 flows, and a current does not flow into the diode D11. Although the oscillation frequency remains 300 [kHz] at this time, a 1.6 [$\mu$sec] switching pulse width satisfies the foregoing condition, so that the overcurrent protecting function is operated. Further, in accordance with the foregoing expressions 14 and 15, Io=1.86[A], so that the load current does not become small.

When the input voltage Vin is larger than the output voltage Vo, the pulse width becomes shorter, so that it is necessary to make the oscillation frequency smaller particularly. On the other hand, when the output voltage Vo is larger, it is desirable not to make the oscillation frequency smaller. Thus, the adjusting circuit 21 can set the oscillation frequency more appropriately according not only to the input voltage Vin but also to the output voltage Vo.

Further, it is noteworthy that the switching power unit is provided with a delaying circuit 23 for forbidding the oscillation frequency changing circuit 18 from performing a changing operation upon activation. It is often that a large-volumetric/low-series-equivalent-resistance output capacitor (capacitance: 10 to 2200 [$\mu$F], series equivalent resistance: 0.001 to 0.1[Ω]) is used as a capacitor C2 in the switching power unit, so that the switching power unit tends to perform an overcurrent detecting operation due to an incoming current for charging the output capacitor. When the overcurrent protecting operation causes the switching frequency to drop, the load current value sometimes drops as described above. Then the delaying circuit 23 forbids the changing operation of the oscillation frequency, so as to avoid an undesired overcurrent protecting operation.

The delaying circuit 23 includes: a constant current source F21 for supplying a constant current by using a constant current Vs generated by the internal constant voltage circuit 20 as a power source; a capacitor C21 which is charged with a constant current from the constant current source F21; a reference voltage source 24; a comparator 25 for comparing a charging voltage of the capacitor C21 with a reference voltage from the reference voltage source 24; and an output transistor Q21 for giving an output from the comparator 25 to P point of the oscillation frequency changing circuit 18 of FIG. 3.

Thus, during a period in which power is turned ON so that a charging voltage of the capacitor C21 charged with a constant current from the constant current source F21 is lower than the reference voltage from the reference voltage source 24, the comparator 25 makes the output transistor Q21 ON, and a whole current of the transistor Q4 in the oscillation frequency changing circuit 18 is bypassed by the transistor Q21 so that the transistor Q6 does not operate so as to forbid the drop of the oscillation frequency. When the capacitor C21 is charged so that a charging voltage is larger than the reference voltage from the reference voltage source 24, the comparator 25 makes the output transistor Q21 OFF so as to allow the oscillation frequency to drop.

For example, supposing that a current of the constant current source F21 is 10 [$\mu$A], and capacitance of the capacitor C21 is 1 [$\mu$F], and a reference voltage of the reference voltage source 24 is 2[V], a charging voltage Vc of the capacitor C21 is as follows.

$$Vc=10\ [\mu A]\div 1\ [\mu F]\times t$$

Thus, the charging voltage Vc exceeds 2[V] after t=0.2 [sec]. Therefore, upon activation of 0.2 [sec] after turning on power, the switching frequency responding to the overcurrent detection does not drop, so that it is possible to solve the foregoing problem brought about upon activation.

Still another embodiment of the present invention is described as follows based on FIG. 8.

Figure 8:
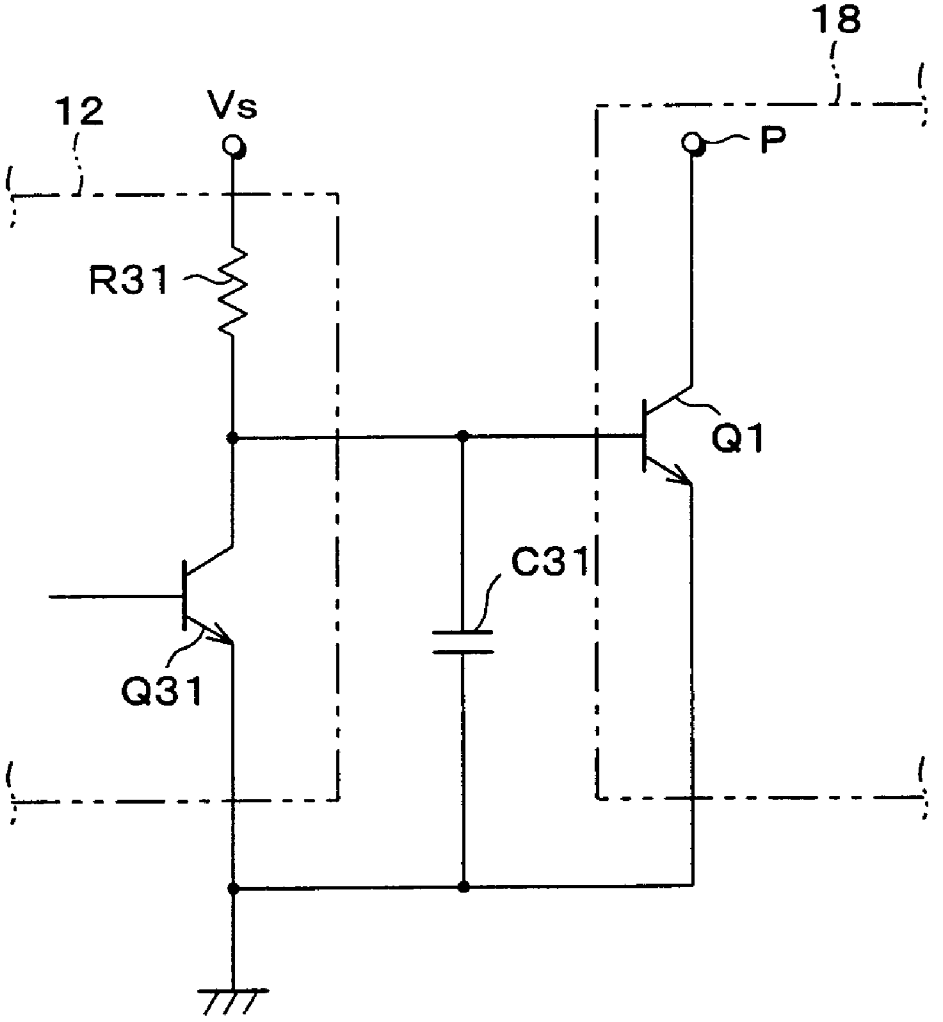
FIG. 8 is an electric circuit diagram showing a structure from an output stage of an RS flip-flop circuit to an input stage of an oscillation frequency changing circuit in a switching power unit of still another embodiment of the present invention.

FIG. 8 is an electric circuit diagram showing a structure from an output stage of the RS flip-flop circuit 12 to an input stage of the oscillation frequency changing circuit 18 in a switching power unit of still another embodiment of the present invention. The output stage of the RS flip-flop circuit 12 is arranged so that: the constant voltage Vs generated by the internal voltage circuit 20 is used as a power source voltage, and there is provided a series circuit of a pull-up resistor R31 and an output transistor Q31 between the power lines. A collector voltage of the output transistor Q31 is given to a base of a transistor Q1 of the input stage of the oscillation frequency changing circuit 18. Then, in the present embodiment, there is provided a capacitor C31 which functions as retaining means between the collector and the emitter of the transistor Q31, that is, between the base and the emitter of the transistor Q1, so that the oscillation frequency changing circuit 18 is made to keep on operating even though the overcurrent detection circuit 11 does not detect an overcurrent temporarily.

In the RS flip-flop circuit 12, under a normal condition, the transistor Q31 is OFF, and the transistor Q1 is ON as described above. On the other hand, under an overcurrent condition, the transistor Q31 becomes ON, and the transistor Q1 becomes OFF described above. In this case, when the transistor Q31 becomes ON, a charge of the capacitor C31 is discharged. Thus, even though an overcurrent is not detected and the transistor Q31 becomes OFF, it takes a predetermined delay time for the charging voltage of the capacitor C31 to make the transistor Q1 ON. Therefore, even though an overcurrent is not detected temporarily, the oscillation frequency changing circuit 18 can retain the oscillation frequency so that the oscillation frequency remains low, instead of restoring the oscillator 16 so as to have a normal oscillation frequency.

While, when the oscillation frequency changing circuit 18 is set by a set signal from the overcurrent detection circuit 11, the oscillation frequency changing circuit 18 makes the transistor Tr1 OFF so as to drop the oscillation frequency of the oscillator 16. However, it is impossible to perform detection by means of the overcurrent detection circuit 11 while the transistor Tr1 is OFF. Thus, when the oscillation frequency changing circuit 18 is reset by a reset signal from the oscillator 16, the oscillation frequency of the oscillator 16 is restored to a normal frequency. Therefore, as shown by vosc in FIG. 2, the oscillation frequency is not fixed and a pulse width of an output voltage wave form and a cycle shown by C_Tr in FIG. 2, so that there is a possibility that the output voltage Vo becomes unstable.

Then, the capacitor C31 retains the oscillation frequency so that the oscillation frequency remains low, so that it is possible to improve the steadiness of the output voltage Vo.

Note that, supposing that a pull up resistor R31=80 [kΩ], and the capacitor C31=80 [pF], and a base/emitter voltage=0.6[V] when the transistor Q1 becomes ON, and Vs=1[V], time the oscillation frequency takes to be actually restored after no overcurrent has come to be detected is as follows.

$$-80\ [pF]\times 80\ [k\Omega]\times 1n(1-0.6\div 1)=5.9\ [\mu sec] \quad (20)$$

Thus, it is possible to obtain a stable wave form. Here, although the capacitor C31 is added in the integrated circuit, it is possible to make the capacitance smaller compared with 150 [pF] of a capacitor c21 of the prior art, so that the chip size can be miniaturized.

Still another embodiment of the present invention is described as follows based on FIG. 9 and FIG. 10.

Figure 9:
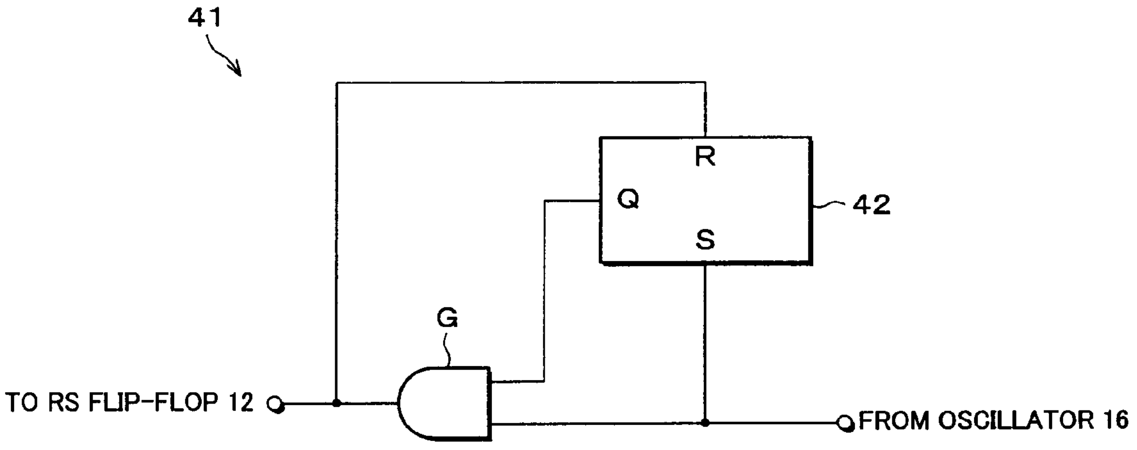
FIG. 9 is a block diagram showing a structure of a dividing circuit of the switching power unit of another embodiment of the present invention.

FIG. 9 is a block diagram showing a structure of a dividing circuit 41 of a switching power unit of still another embodiment of the present invention. The dividing circuit 41 is provided in a path of a reset signal from the oscillator 16 to the RS flip-flop circuit 12. The dividing circuit 41 is arranged so that an AND gate G is further added to the RS flip-flop circuit 42. Except for this, the structure is the same as the structure of FIG. 1.

A reset signal from the oscillator 16 is inputted to a set terminal S of the RS flip-flop circuit 42 and is given to one input of the AND gate G, and an output from an output terminal Q of the RS flip-flop circuit 42 is given to the other input of the AND gate G. An output of the AND gate G is given to the RS flip-flop circuit 12 as a divided reset signal and returns to a reset terminal R of the RS flip-flop circuit 42.

Figure 10:
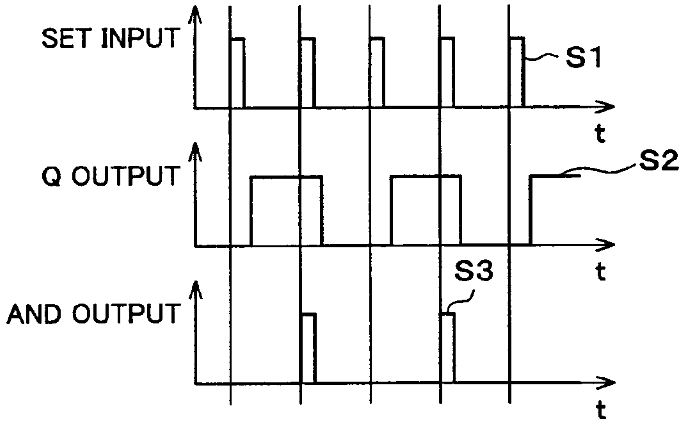
FIG. 10 is a wave form chart for illustrating an operation of the dividing circuit.
Figure 11:
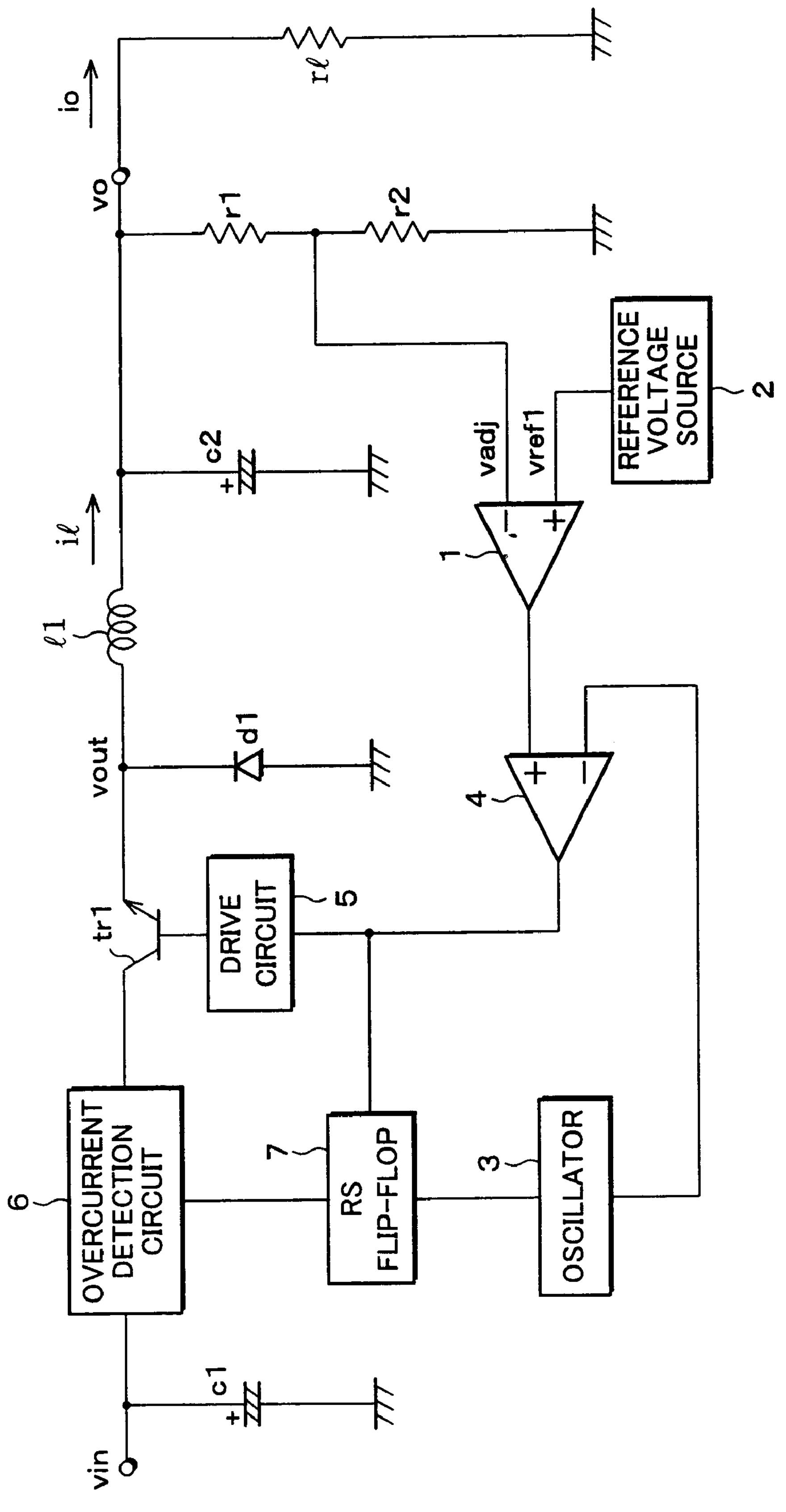
FIG. 11 is a block diagram showing an electric structure of a switching power unit of a typical prior art.
Figure 12:
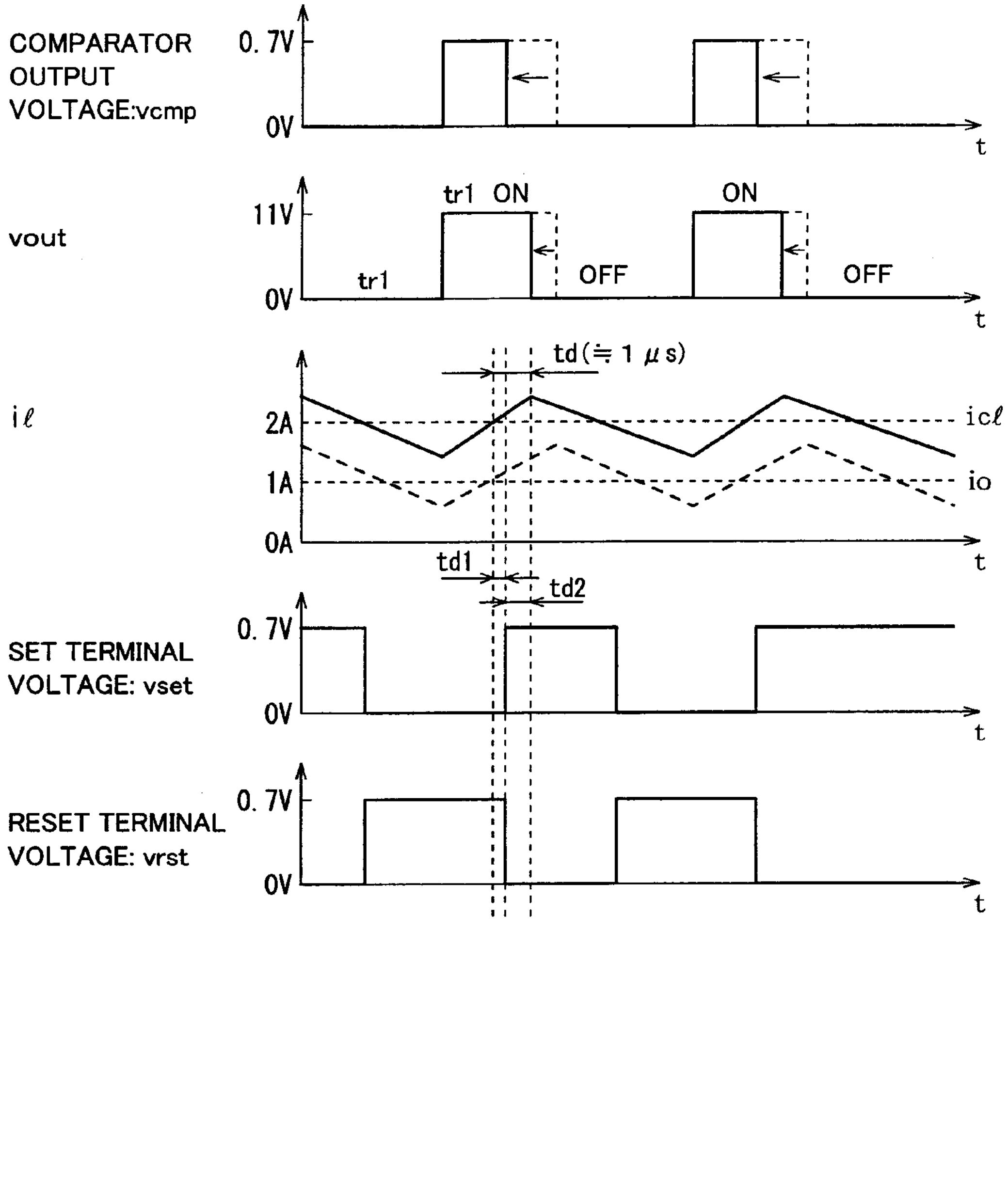
FIG. 12 is a wave form chart for illustrating an operation of the switching power unit shown in FIG. 11.
Figure 13:
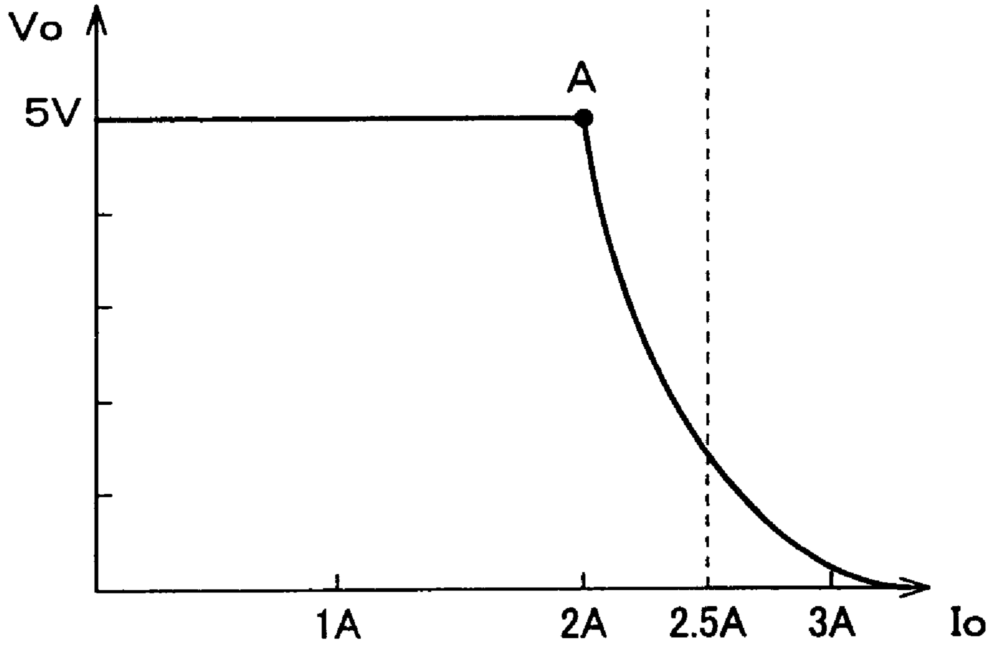
FIG. 13 is a graph showing an operation characteristic of the switching power unit shown in FIG. 11.

FIG. 10 is a wave form chart for illustrating an operation of the dividing circuit 41. In FIG. 10, S1 indicates a reset signal from the oscillator 16. The reset signal is inputted to the set terminal S of the RS flip-flop circuit 42 having a delay time, so that the RS flip-flop circuit 42, as shown by S2 in FIG. 10, allows the output terminal Q to be a high level after 50 [nsec] for example, and the output terminal Q keeps on outputting a high level until a high level signal is inputted to the reset terminal R.

Thus, the AND gate G, as shown by S3 in FIG. 10, outputs a high level by inputting a next reset signal, and the RS flip-flop circuit 42 allows the output terminal Q to be a low level after 500 [nsec]. Thus, it is obvious by comparing S1 and S3 in FIG. 10 that the reset signal from the oscillator 16 is divided at ½.

In the structure of FIG. 1, a frequency of the reset signal outputted from the oscillator 16 to the RS flip-flop circuit 12 is the same as the oscillation frequency of the oscillator 16. On the other hand, it is possible to set the reset signal to ½ as described above by using the dividing circuit 42. As described above, the oscillation frequency of the oscillator 16 causes switching to be performed under a normal condition. Contrary, the switching frequency depends not on the oscillation frequency but on the frequency of the reset signal under an overcurrent condition.

Thus, the frequency of the reset signal is divided at ½ of the oscillation frequency, so that a switching OFF period becomes doubled under an overcurrent condition, and the switching frequency equivalently drops. For example, in a case where a switching ON time is sufficiently shorter than a switching OFF time, it is possible to allow the switching frequency to be ½ compared with a normal condition.

As described above, a switching power unit of the present invention, in which a switching element (transistor Tr1) switches an input d.c. voltage in response to an oscillation signal from oscillating means (oscillator 16) so as to obtain a voltage output of a desired level, and when overcurrent detection means (overcurrent detection circuit 11) detects that an output current is larger than a predetermined value, overcurrent protecting means (RS flip-flop circuit 12) shortens a switching pulse width so as to restrict the output current, includes: latching means (RS flip-flop circuit 12) for latching an overcurrent detection output from the overcurrent detection means for a period longer than a delay time taken to realize a protecting operation by means of the overcurrent protecting means; first oscillation frequency dropping means (oscillation frequency changing circuit) for dropping an oscillation frequency of the oscillating means from a first oscillation frequency under a normal condition to (a) an oscillation frequency lower than the first oscillation frequency and (b) a second oscillation frequency of a cycle longer than the delay time, in response to an output from the latching means; and second oscillation frequency dropping means (oscillation frequency changing circuit) for detecting a drop of an output voltage of a predetermined level so as to drop the oscillation frequency of the oscillating means to a third oscillation frequency lower than the second oscillation frequency.

According to the arrangement, when the overcurrent detection means detects the overcurrent condition so as to start an operation of the overcurrent protecting means, the first oscillation frequency dropping means drops the oscillation frequency of the oscillating means from the first oscillation frequency under a normal condition to the second oscillation frequency. The second oscillation frequency has a cycle longer than the delay time taken to realize the protecting operation by means of the overcurrent protecting means.

Thus, in the first oscillation frequency, a switching pulse width under a normal condition is short, so that the overcurrent protecting operation sometimes cannot shorten the switching pulse width. However, in the second oscillation frequency, the ON time of the switching element is longer than the delay time the switching element takes to turn OFF after the overcurrent condition is detected, so that the overcurrent protecting operation is efficiently performed, thus reducing the output current.

Similarly, when the second oscillation frequency dropping means detects that the output voltage becomes lower than a predetermined level due to an output short circuit etc., the second oscillation frequency dropping means further drops the oscillation frequency of the oscillating means to the third oscillation frequency. Thus, after the oscillation frequency is dropped from the first oscillation frequency to the second oscillation frequency, the switching pulse width that has been shortened by the overcurrent protecting operation is made wider again, so that it is possible to minimize the influence exerted by the delay time. Thus, it is possible to prevent increase of the output current brought about by the influence of the delay time.

Thus, it is possible to heighten the first oscillation frequency close to an upper limit of an operation frequency, for example, of a switching transistor regardless of the delay time, so that it is possible to miniaturize a coil and a capacitor externally provided on the oscillating means and the overcurrent protecting means that are formed as an integrated circuit, and to realize further miniaturization and a low cost of the switching power unit.

Further, the overcurrent detection output from the overcurrent detecting means is given to the first oscillation frequency dropping means via the latching means that performs latching for a period longer than the delay time. Thus, even though a switching pulse is outputted at the first oscillation frequency, the overcurrent detection output is retained, so that the oscillation frequency of the oscillating means is dropped without fail. Then, the oscillation frequency of the oscillating means is restored to the first oscillation frequency after the switching power unit is released from the overcurrent condition and the output voltage smoothed by the capacitor in the output stage is restored to a normal voltage, so that it is not necessary to provide the time constant circuit which prevents hunting. Thus, not only external parts but also the chip size of the integrated circuit itself can be miniaturized.

Further, the switching power unit of the present invention may be arranged so that: an output voltage of a predetermined level is set according to the input voltage.

According to the arrangement, when the input voltage is large, the oscillation frequency is dropped from a high output voltage, and when the input voltage is small, the oscillation frequency is dropped from a low output voltage, so that it is possible to improve a decrease/increase characteristic of a current value in the case of the short circuit.

Moreover, the switching power unit of the present invention may be arranged so that: adjusting means (adjusting circuit 21) is provided so that the oscillation frequency changes according to the input or output voltage in relation to the second oscillation frequency dropping means.

According to the arrangement, when the input voltage is larger than the output voltage, the duty is small. Thus, in order to make the ON period of the switching element longer so that the overcurrent protecting operation is efficiently performed, it is necessary to make the second oscillation frequency lower in particular. While, if the oscillation frequency is made lower when the output voltage is large, the load current becomes too small, so that it is sometimes desirable that the oscillation frequency is not made lower. With respect to this, the oscillation frequency is set according not only to the input voltage but also to the output voltage.

Thus, it is possible to set the oscillation frequency more appropriately.

Further, a switching power unit of the present invention may be arranged so that: there is provided delaying means (delaying circuit 23) for forbidding that the first oscillation frequency dropping means change the oscillation frequency upon activation in relation to the first oscillation frequency dropping means.

According to the arrangement, in the switching power unit, it is often that an output capacitor (C2) of a large volumetric/low series equivalent resistor is used so as to smooth an output, so that the overcurrent detection operation tends to be performed by an incoming current for charging the output capacitor upon activation. In this case, when the switching frequency is dropped by the overcurrent protecting operation, the load current value is dropped, so that only a low current can flow. Thus, the delaying means forbids the changing operation of the oscillation frequency.

Therefore, it is possible to avoid an undesired overcurrent protecting operation upon activation so as to supply the load current sufficiently.

Furthermore, the switching power unit of the present invention may be arranged so that: there is provided retaining means (capacitor C31) for retaining an overcurrent detection output of the latching means, between the latching means and the first oscillation frequency dropping means, in relation to the first oscillation frequency dropping means.

According to the arrangement, when the switching element is OFF-driven by means of the overcurrent protecting means, the overcurrent detection means does not detect an overcurrent condition, so that the first oscillation frequency dropping means is to restore the oscillation frequency to a frequency under a normal condition. While, the retaining means retains the overcurrent detection output, so that it is possible to retain the oscillation frequency so that the oscillation frequency remains dropped even though the overcurrent is not detected temporarily.

Thus, it is possible to stabilize a pulse width and a cycle of the switching pulse.

Further, the switching power unit of the present invention may be arranged so that: there is provided dividing means (dividing circuit 41) for dividing the reset signal in relation to the latching means.

According to the arrangement, the latching means is reset for each switching pulse. While, the reset signal is divided, so that it is possible to stabilize the switching frequency not at the oscillation frequency but at the reset signal frequency.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A switching power unit comprising:

a switching element for switching an input d.c. voltage in response to an oscillation signal from oscillating means so as to obtain a voltage output of a desired level;

overcurrent protecting means for shortening a switching pulse width so as to restrict an output current when overcurrent detection means detects that the output current is larger than a predetermined value;

latching means for latching an overcurrent detection output from the overcurrent detection means for a period longer than a delay time taken to realize a protecting operation by means of the overcurrent protecting means;

first oscillation frequency dropping means for dropping an oscillation frequency of the oscillating means from a first oscillation frequency under a normal condition to (a) an oscillation frequency lower than the first oscillation frequency and (b) a second oscillation frequency of a cycle longer than the delay time, in response to an output from the latching means; and second oscillation frequency dropping means for detecting a drop of an output voltage of a predetermined level so as to drop the oscillation frequency of the oscillating means to a third oscillation frequency lower than the second oscillation frequency.

2. The switching power unit as set forth in claim 1, wherein the output voltage of the predetermined level is set according to an input voltage.

3. The switching power unit as set forth in claim 1, wherein there is provided adjusting means for changing the oscillation frequency according to an input voltage and the output voltage in relation to the second oscillation frequency dropping means.

4. The switching power unit as set forth in claim 1, wherein there is provided delaying means for forbidding that the first oscillation frequency dropping means change the oscillation frequency upon activation in relation to the first oscillation frequency dropping means.

5. The switching power unit as set forth in claim 1, wherein there is provided retaining means for retaining an overcurrent detection output of the latching means, between the latching means and the first oscillation frequency dropping means, in relation to the first oscillation frequency dropping means.

6. The switching power unit as set forth in claim 1, wherein there is provided dividing means for dividing a reset signal in relation to the latching means.

7. The switching power unit as set forth in claim 1, wherein there is provided dividing means for dividing a reset signal from the oscillating means so as to give the reset signal, that has been divided, to the latching means.

* * * * *